United States Patent
Kim et al.

(10) Patent No.: US 9,819,197 B2
(45) Date of Patent: Nov. 14, 2017

(54) METHOD AND APPARATUS FOR CONTROLLING INTERFERENCE IN WIRELESS POWER TRANSMISSION SYSTEM

(71) Applicant: Samsung Electronics Co., Ltd., Suwon-si (KR)

(72) Inventors: Nam Yun Kim, Seoul (KR); Sang Wook Kwon, Seongnam-si (KR); Ki Young Kim, Yongin-si (KR); Bong Chul Kim, Seoul (KR); Yun Kwon Park, Dongducheon-si (KR); Jae Hyun Park, Yongin-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 14/332,758

(22) Filed: Jul. 16, 2014

(65) Prior Publication Data

US 2015/0022016 A1 Jan. 22, 2015

(30) Foreign Application Priority Data

Jul. 22, 2013 (KR) .................. 10-2013-0086340

(51) Int. Cl.
 *H02J 5/00* (2016.01)
 *H04B 5/00* (2006.01)

(52) U.S. Cl.
 CPC ............ *H02J 5/005* (2013.01); *H04B 5/0031* (2013.01); *H04B 5/0037* (2013.01)

(58) Field of Classification Search
 CPC ........................................... H04B 5/00

USPC ........................................... 307/104
See application file for complete search history.

(56) References Cited

U.S. PATENT DOCUMENTS

| | | | | |
|---|---|---|---|---|
| 4,354,191 A | * | 10/1982 | Matsumura | G01S 7/023 342/104 |
| 6,603,746 B1 | * | 8/2003 | Larijani | H04L 1/0021 370/318 |
| 7,254,366 B2 | * | 8/2007 | Palermo | H02J 7/025 455/101 |
| 8,823,319 B2 | * | 9/2014 | Von Novak, III | H02J 7/025 320/108 |

(Continued)

FOREIGN PATENT DOCUMENTS

| | | | | |
|---|---|---|---|---|
| JP | 2012235674 A | * | 11/2012 | ........... H04B 5/0037 |
| KR | 10-2012-0135077 A | | 12/2012 | |

(Continued)

OTHER PUBLICATIONS

International Search Report dated Nov. 24, 2014, in counterpart International Application No. PCT/KR2014/006641 (3 pages, in English).

(Continued)

*Primary Examiner* — Adi Amrany
(74) *Attorney, Agent, or Firm* — NSIP Law

(57) ABSTRACT

An interference control method of a power transmitting unit (PTU) includes determining whether the PTU is in an interference environment in which interference by a neighbor PTU occurs, and controlling a communication parameter of either one or both of the neighbor PTU and a power receiving unit (PRU) in response to a result of the determining being that the PTU is in the interference environment.

21 Claims, 22 Drawing Sheets

(56) References Cited

U.S. PATENT DOCUMENTS

| | | | |
|---|---|---|---|
| 8,891,390 B2* | 11/2014 | Kanzaki | H04B 7/0426 370/252 |
| 2001/0028685 A1* | 10/2001 | Sydon | H04W 52/24 375/285 |
| 2006/0238365 A1 | 10/2006 | Vecchione et al. | |
| 2006/0270433 A1* | 11/2006 | Kelton | H04W 52/26 455/522 |
| 2007/0165754 A1* | 7/2007 | Kiukkonen | H04B 1/715 375/346 |
| 2007/0213009 A1* | 9/2007 | Higashida | H04B 7/18508 455/62 |
| 2007/0270175 A1* | 11/2007 | Malladi | H04W 52/367 455/522 |
| 2008/0125160 A1* | 5/2008 | Zhu | H04W 52/20 455/522 |
| 2008/0227478 A1* | 9/2008 | Greene | G06K 19/0701 455/522 |
| 2009/0088605 A1* | 4/2009 | Ross | A61B 5/0002 600/300 |
| 2011/0127952 A1 | 6/2011 | Walley et al. | |
| 2011/0300805 A1* | 12/2011 | Gaikwad | H04W 52/244 455/63.1 |
| 2012/0071192 A1* | 3/2012 | Li et al. | H04W 74/085 455/522 |
| 2012/0164961 A1* | 6/2012 | Gao | H04W 52/241 455/127.1 |
| 2012/0220228 A1* | 8/2012 | Tandai | H04W 72/02 455/41.1 |
| 2012/0280574 A1* | 11/2012 | Hur | H04B 5/0037 307/104 |
| 2013/0002035 A1* | 1/2013 | Oodachi | H02J 5/005 307/104 |
| 2013/0033118 A1 | 2/2013 | Karalis et al. | |
| 2013/0035126 A1 | 2/2013 | Kim et al. | |
| 2013/0058380 A1* | 3/2013 | Kim | H04B 1/707 375/146 |
| 2013/0082536 A1* | 4/2013 | Taylor | H02J 7/025 307/104 |
| 2013/0154387 A1 | 6/2013 | Lee et al. | |
| 2013/0184020 A1* | 7/2013 | Hoshihara | H04W 24/02 455/501 |
| 2013/0328417 A1* | 12/2013 | Takeuchi | H02J 5/005 307/149 |
| 2014/0021795 A1* | 1/2014 | Robertson | H01F 38/18 307/104 |
| 2014/0119220 A1* | 5/2014 | Wang | H04W 52/244 370/252 |
| 2014/0243041 A1* | 8/2014 | Zhao | H04W 88/06 455/552.1 |
| 2014/0349573 A1* | 11/2014 | Moes | H04B 5/0037 455/41.1 |

FOREIGN PATENT DOCUMENTS

| | | |
|---|---|---|
| KR | 10-2013-0026353 A | 3/2013 |
| KR | 10-2013-0055328 A | 5/2013 |
| WO | WO 2013/022207 A1 | 2/2013 |

OTHER PUBLICATIONS

Extended European Search Report dated Jan. 31, 2017 in counterpart International Patent Application No. 14829457.2 (8 pages in English).

* cited by examiner

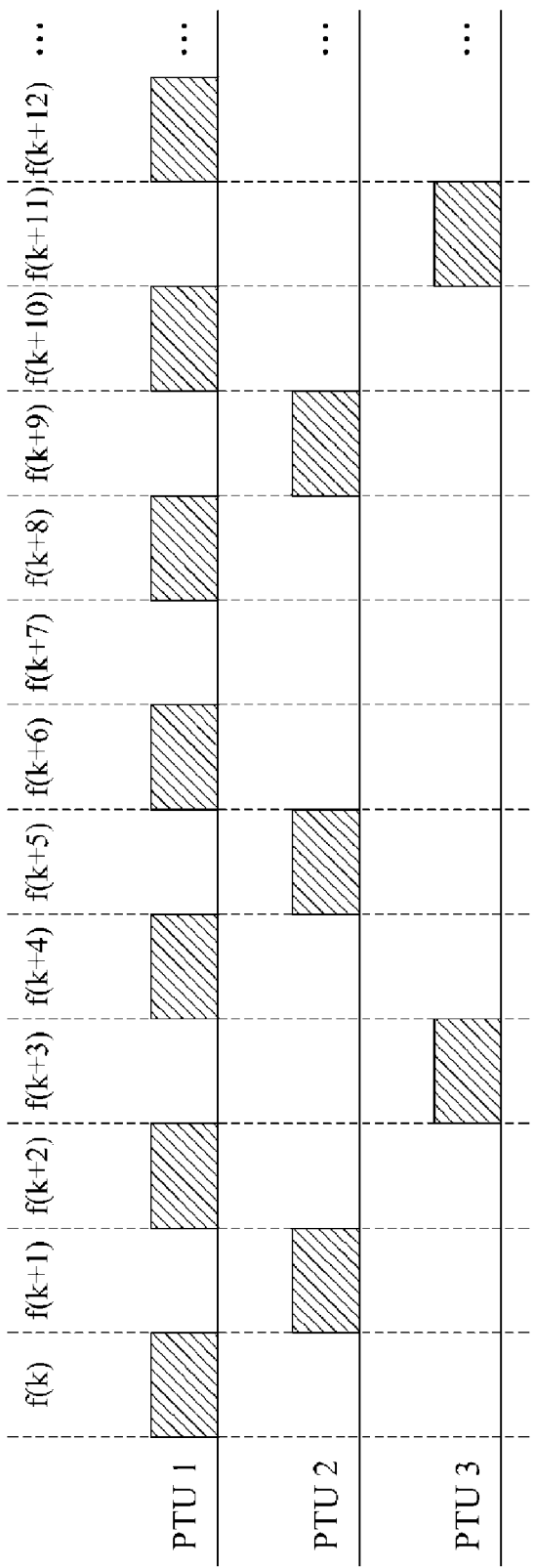

FIG. 10

| Frequency | LL | |
|---|---|---|
| 2402 MHz | 37 | |
| 2404 MHz | 0 | |
| 2406 MHz | 1 | ~1010 |
| 2408 MHz | 2 | |
| 2410 MHz | 3 | |
| 2412 MHz | 4 | |
| 2414 MHz | 5 | |
| 2416 MHz | 6 | |
| 2418 MHz | 7 | |
| 2420 MHz | 8 | |
| 2422 MHz | 9 | |
| 2424 MHz | 10 | ~1020 |
| 2426 MHz | 38 | |
| 2428 MHz | 11 | |
| 2430 MHz | 12 | |
| 2432 MHz | 13 | |
| 2434 MHz | 14 | ~1030 |
| 2436 MHz | 15 | |
| 2438 MHz | 16 | ~1040 |
| 2440 MHz | 17 | |
| 2442 MHz | 18 | |
| 2444 MHz | 19 | |
| 2446 MHz | 20 | |
| 2448 MHz | 21 | |
| 2450 MHz | 22 | |
| 2452 MHz | 23 | |
| 2454 MHz | 24 | ~1050 |
| 2456 MHz | 25 | |
| 2458 MHz | 26 | |
| 2460 MHz | 27 | |
| 2462 MHz | 28 | |
| 2464 MHz | 29 | |
| 2466 MHz | 30 | |
| 2468 MHz | 31 | |
| 2470 MHz | 32 | |
| 2472 MHz | 33 | |
| 2474 MHz | 34 | |
| 2476 MHz | 35 | |
| 2478 MHz | 36 | |
| 2480 MHz | 39 | |

METHOD AND APPARATUS FOR CONTROLLING INTERFERENCE IN WIRELESS POWER TRANSMISSION SYSTEM

CROSS-REFERENCE TO RELATED APPLICATIONS

This application claims the benefit under 35 USC 119(a) of Korean Patent Application No. 10-2013-0086340 filed on Jul. 22, 2013, in the Korean Intellectual Property Office, the entire disclosure of which is incorporated herein by reference for all purposes.

BACKGROUND

1. Field

The following description relates to an apparatus and a method for controlling interference in a wireless power transmission system.

2. Description of Related Art

Wireless power is energy that is transmitted from a power transmitting unit (PTU) to a power receiving unit (PRU) through magnetic coupling. Accordingly, a wireless power transmission system or a wireless power charging system includes a source device and a target device. The source device wirelessly transmits power, and the target device wirelessly receives power. The source device may be referred to as a source or a PTU, and the target device may be referred to as a target or a PRU.

The source device includes a source resonator, and the target device includes a target resonator. Magnetic coupling or resonant coupling occurs between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an interference control method of a power transmitting unit (PTU) includes determining whether the PTU is in an interference environment in which interference by a neighbor PTU occurs; and controlling a communication parameter of either one or both of the neighbor PTU and a power receiving unit PRU in response to a result of the determining being that the PTU is in the interference environment.

The communication parameter may include any one or any combination of a communication time, a transmission power, and a communication frequency.

The controlling may include controlling a magnitude of the transmission power.

The transmission power may include a wake-up power.

The controlling may include controlling a frequency hopping interval of the communication frequency.

The PTU and the neighbor PTU may be in a network that has been arbitrarily configured; and any one or any combination of a communication time, a transmission power, and a communication frequency of the neighbor PTU may be preset.

The determining may include detecting a communication error rate in communication between the PTU and the neighbor PTU; and determining whether the PTU is in the interference environment based on the detected communication error rate.

The determining may include detecting a number of neighbor PTUs; and determining whether the PTU is in the interference environment based on the detected number of the neighbor PTUs.

The determining may include detecting a received signal strength indicator (RSSI) of the neighbor PTU or the PRU; and determining whether the PTU is in the interference environment based on the detected RSSI.

The determining may include detecting a frequency channel being used by the neighbor PTU; and determining whether the PTU is in the interference environment based on the detected frequency channel.

The method may further include configuring a network including the PTU and the neighbor PTU.

The PTU may be configured to operate in a master mode.

The method may further include configuring a network including the PTU; and the neighbor PTU may be configured to configure the network including the PTU.

The may further include configuring a network including the PTU; and the neighbor PTU may be configured to configure a network that is different from the network including the PTU.

The controlling may include controlling an interval of a report signal to be received from the PRU.

The report signal may include any one or any combination of information on power received by the PRU, information on a state of the PRU, and information on a temperature of the PRU.

The controlling may include controlling either one or both of a transmission interval and a transmission start time of a signal transmitted by the neighbor PTU.

The signal transmitted by the neighbor PTU may include a beacon signal.

The method may further include sharing information on the communication parameter with the neighbor PTU.

In another general aspect, a power transmitting unit (PTU) includes an interference environment determiner configured to determine whether the PTU is in an interference environment in which interference by a neighbor PTU occurs; and a communication parameter controller configured to control a communication parameter of either one or both of the neighbor PTU and a power receiving unit (PRU) in response to the interference environment determiner determining that the PTU is in the interference environment.

In another general aspect, an interference control method of a power transmitting unit (PTU) includes determining whether a neighbor PTU is interfering with the PTU or has a potential to interfere with the PTU; and controlling either one or both of the neighbor PTU and a power receiving unit (PRU) to prevent the neighbor PTU from interfering with the PTU in response to a result of the determining being that the neighbor PTU is interfering with the PTU or has a potential to interfere with the PTU.

The PTU may be configured to operate as a master device in a network; and the neighbor PTU may be configured to operate as a slave device in the network.

The PTU and the neighbor PTU may be connected to a network that has been arbitrarily configured under authorization of a host; and at least one communication parameter of each of the PTU and the neighbor PTU may be preset by the host.

Other features and aspects will be apparent from the following detailed description, the drawings, and the claims.

BRIEF DESCRIPTION OF THE DRAWINGS

FIGS. 9A and 9B illustrate an example of controlling a transmission interval and a transmission start time.

FIG. 10 illustrates an example of controlling a frequency hopping interval.

DETAILED DESCRIPTION

Figure 1:
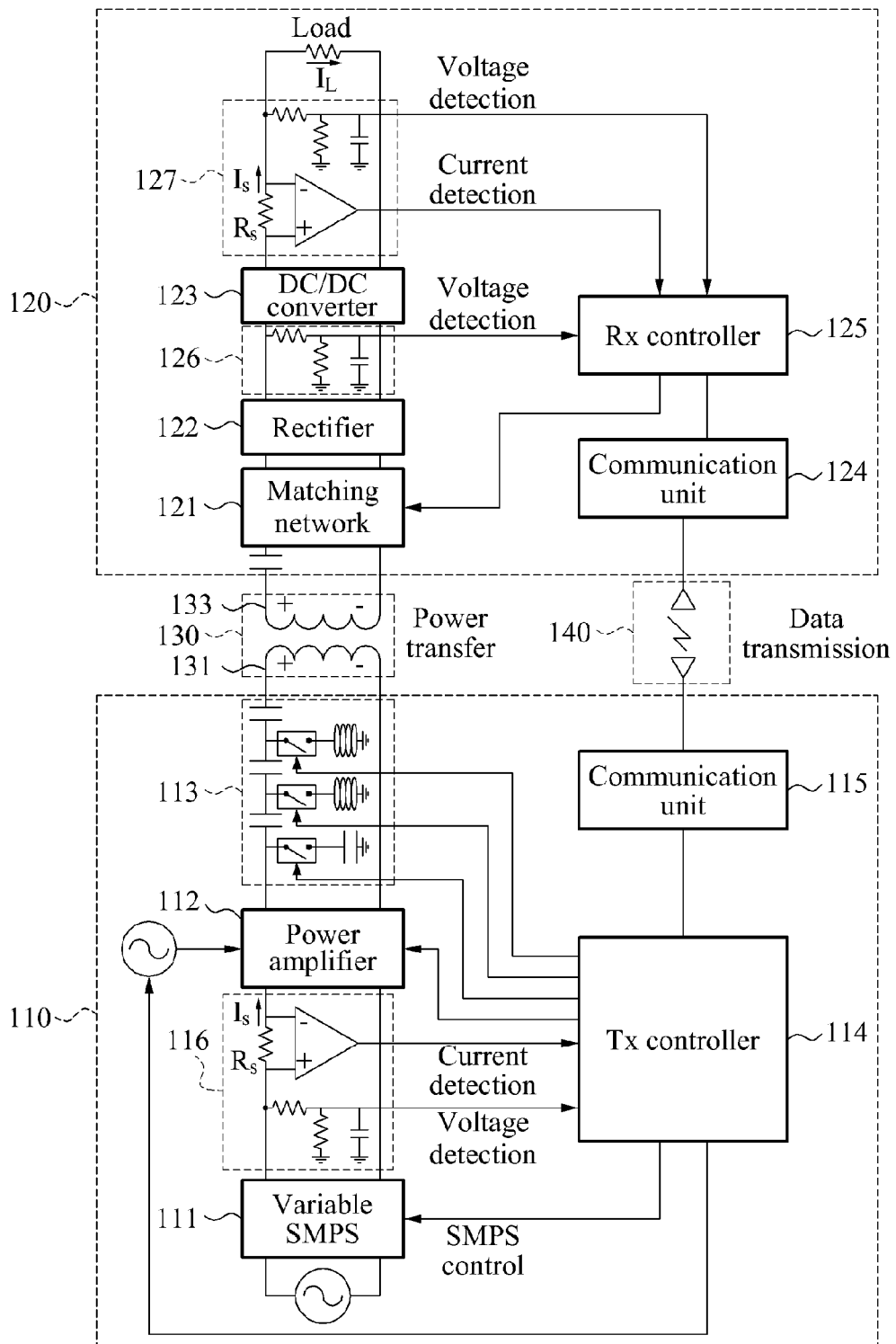
FIG. 1 illustrates an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Schemes of communication between a source and a target or between a source and another source may include an in-band communication scheme and an out-of-band communication scheme.

In the in-band communication scheme, the source and the target, or the source and the other source, communicate with each other using a frequency that is the same as a frequency used for power transmission.

In the out-of-band communication scheme, the source and the target, or the source and the other source, communicate with each other using a frequency that is different from a frequency used for power transmission.

FIG. 1 illustrates an example of a wireless power transmission system.

Referring to FIG. 1, the wireless power transmission system includes a source 110 and a target 120. The source 110 is a device configured to supply wireless power, and may be any electronic device capable of supplying power, for example, a pad, a terminal, a tablet personal computer (PC), a television (TV), a medical device, or an electric vehicle. The target 120 is a device configured to receive wireless power, and may be any electronic device requiring power to operate, for example, a pad, a terminal, a tablet PC, a medical device, an electric vehicle, a washing machine, a radio, or a lighting system.

The source 110 includes a variable switching mode power supply (SMPS) 111, a power amplifier (PA) 112, a matching network 113, a transmission (Tx) controller 114 (for example, Tx control logic), a communication unit 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a fixed DC voltage, or may output an adjustable DC voltage that may be adjusted under control of the Tx controller 114.

The variable SMPS 111 may control its output voltage supplied to the PA 112 based on a level of power output from the PA 112 so that the PA 112 may operate in a saturation region with a high efficiency at all times, thereby enabling a maximum efficiency to be maintained at all levels of the output power of the PA 112. The PA 112 may be, for example, a class-E amplifier.

If a fixed SMPS is used instead of the variable SMPS 111, a variable DC-to-DC (DC/DC) converter may be necessary. In this example, the fixed SMPS outputs a fixed DC voltage to the variable DC/DC converter, and the variable DC/DC converter controls its output voltage supplied to the PA 112 based on the level of the power output from the PA 112 so that the PA 112, which may be a Class-E amplifier, may operate in the saturation region with a high efficiency at all times, thereby enabling the maximum efficiency to be maintained at all levels of the output power.

The power detector 116 detects an output current and an output voltage of the variable SMPS 111, and transmits, to the Tx controller 114, information on the detected output current and the detected output voltage. Additionally, the power detector 116 may detect an input current and an input voltage of the PA 112.

The PA 112 generates power by converting a DC voltage having a predetermined level supplied to the PA 112 by the variable SMPS 111 to an AC voltage using a switching pulse signal having a frequency in a band of a few megahertz (MHz) to tens of MHz. For example, the PA 112 may convert the DC voltage supplied to the PA 112 to an AC voltage having a reference resonant frequency $F_{Ref}$, and may generate communication power used for communication, and/or charging power used for charging. The communication power and the charging power may be used in a plurality of targets.

If a high power from a few kilowatts (kW) to tens of kW is transmitted using a resonant frequency in a band of tens of kilohertz (kHz) to hundreds of kHz, the PA 112 may be omitted, and power may be supplied to a source resonator 131 from the variable SMPS 111 or a high-power power supply. For example, an inverter may be used in lieu of the PA 112. The inverter may convert a DC power supplied from the high-power power supply to an AC power. The inverter may convert the power by converting a DC voltage having a predetermined level to an AC voltage using a switching pulse signal having a frequency in a band of tens of kHz to hundreds of kHz. For example, the inverter may convert the DC voltage having the predetermined level to an AC voltage having a resonant frequency of the source resonator 131 in a band of tens of kHz to hundreds of kHz.

As used herein, the term "communication power" refers to a low power of 0.1 milliwatt (mW) to 1 mW. The term "charging power" refers to a high power of a few mW to tens of kW consumed by a load of a target. As used herein, the term "charging" refers to supplying power to a unit or element configured to charge a battery or other rechargeable device. Additionally, the term "charging" refers to supplying power to a unit or element configured to consume power. For example, the term "charging power" may refer to power consumed by a target while operating, or power used to charge a battery of the target. The units or element may be, for example, a battery, a display device, a sound output circuit, a main processor, or any of various types of sensors.

As used herein, the term "reference resonant frequency" refers to a resonant frequency nominally used by the source 110. Additionally, the term "tracking frequency" refers to a resonant frequency used by the source 110 that has been adjusted based on a preset scheme.

The Tx controller 114 may detect a reflected wave of the communication power or the charging power, and may detect mismatching that may occur between a target resonator 133 and the source resonator 131 based on the detected reflected wave. To detect the mismatching, for example, the Tx controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the Tx controller 114. The matching network 113 includes at least one inductor and at least one capacitor each connected to a respective switch controlled by the Tx controller 114.

If a high power is to be transmitted using a resonant frequency in a band of tens of kHz to hundreds of kHz, the matching network 113 may be omitted from the source 110 because the effect of the matching network 113 may be reduced when transmitting a high power.

The Tx controller 114 may calculate a voltage standing wave ratio (VSWR) based on a voltage level of the reflected wave and a level of an output voltage of the source resonator 131 or the PA 112. In one example, if the VSWR is greater than a predetermined value, the Tx controller 114 may determine that a mismatch is detected between the source resonator 131 and the target resonator 133.

In another example, if the Tx controller 114 detects that the VSWR is greater than the predetermined value, the Tx controller 114 may calculate a wireless power transmission efficiency for each of N tracking frequencies, determine a tracking frequency $F_{Best}$ providing the best wireless power transmission efficiency among the N tracking frequencies, and adjust the reference resonant frequency $F_{Ref}$ to the tracking frequency $F_{Best}$. The N tracking frequencies may be set in advance.

The Tx controller 114 may adjust a frequency of the switching pulse signal used by the PA 112. The frequency of the switching pulse signal may be determined under the control of the Tx controller 114. For example, by controlling the PA 112, the Tx controller 114 may generate a modulated signal to be transmitted to the target 120. In other words, the Tx controller 114 may transmit a variety of data to the target 120 using in-band communication. The Tx controller 114 may also detect a reflected wave, and may demodulate a signal received from the target 120 from an envelope of the detected reflected wave.

The Tx controller 114 may generate a modulated signal for in-band communication using various methods. For example, the Tx controller 114 may generate the modulated signal by turning the switching pulse signal used by the PA 112 on and off, by performing delta-sigma modulation, or by any other modulation method known to one of ordinary skill in the art. Additionally, the Tx controller 114 may generate a pulse-width modulated (PWM) signal having a predetermined envelope.

The Tx controller 114 may determine an initial wireless power to be transmitted to the target 120 based on a change in a temperature of the source 110, a battery state of the target 120, a change in an amount of power received by the target 120, and/or a change in a temperature of the target 120.

The source 110 may further include a temperature measurement sensor (not illustrated) configured to detect a change in a temperature of the source 110. The source 110 may receive from the target 120 information regarding the battery state of the target 120, the change in the amount of power received by the target 120, and/or the change in the temperature of the target 120 by communicating with the target 120. The source 110 may detect the change in the temperature of the target 120 based on the information received from the target 120.

The Tx controller 114 may adjust a voltage supplied to the PA 112 based on the change in the temperature of the target 120 using a lookup table. The lookup table may store a level of the voltage to be supplied to the PA 112 based on the change in the temperature of the source 110. For example, when the temperature of the source 110 rises, the Tx controller 114 may reduce the voltage to be supplied to the PA 112 by controlling the variable SMPS 111.

The communication unit 115 may perform out-of-band communication using a separate communication channel. The communication unit 115 may include a communication module, such as a ZigBee module, a Bluetooth module, or any other communication module known to one of ordinary skill in the art, that the communication unit 115 may use to transmit or receive data 140 to or from the target 120 using the out-of-band communication.

The source resonator 131 transmits electromagnetic energy 130 to the target resonator 133. For example, the source resonator 131 may transmit the communication power or the charging power to the target 120 through magnetic coupling with the target resonator 133.

The source resonator 131 may be made of a superconducting material. In addition, although not shown in FIG. 1, the source resonator 131 may be disposed in a container of refrigerant to enable the source resonator 131 to maintain a superconducting state. A heated refrigerant that has transitioned to a gaseous state may be liquefied to a liquid state by a cooler. The target resonator 133 may also be made of a superconducting material. In this instance, the target resonator 133 may also be disposed in a container of refrigerant to enable the target resonator 133 to maintain a superconducting state.

As illustrated in FIG. 1, the target 120 includes a matching network 121, a rectifier 122, a DC/DC converter 123, a communication unit 124, a reception (Rx) controller 125 (for example, Rx control logic), a voltage detector 126, and a power detector 127.

The target resonator 133 receives the electromagnetic energy 130 from the source resonator 131. For example, the target resonator 133 may receive the communication power or the charging power from the source 110 through a magnetic coupling with the source resonator 131. Additionally, the target resonator 133 may receive data from the source 110 using the in-band communication.

The target resonator 133 may receive the initial wireless power determined by the Tx controller 114 based on the change in the temperature of the source 110, the battery state of the target 120, the change in the amount of power received by the target 120, and/or the change in the temperature of the target 120.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received from the target resonator 133.

The DC/DC converter 123 adjusts a level of the DC voltage output from the rectifier 122 based on a voltage required by the load. As an example, the DC/DC converter 123 may adjust the level of the DC voltage output from the rectifier 122 to a level in a range from 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a wireless power transmission efficiency of the power received from the source 110. Additionally, the detected current and the detected voltage of the output terminal may be used by the Rx controller 125 to calculate an amount of power actually transferred to the load. The Tx controller 114 of the source 110 may calculate an amount of power that needs to be transmitted by the source 110 to the target 120 based on an amount of power required by the load and the amount of power actually transferred to the load.

If the amount of the power actually transferred to the load calculated by the Rx controller 125 is transmitted to the source 110 by the communication unit 124, the source 110 may calculate an amount of power that needs to be transmitted to the target 120, and may control either one or both of the variable SMPS 111 and the PA 112 to generate an amount of power that will enable the calculated amount of power to be transmitted by the source 110.

The Rx controller 125 may perform in-band communication to transmit and receive data to and from the source 110 using a resonant frequency. During the in-band communication, the Rx controller 125 may demodulate a received signal by detecting a signal between the target resonator 133 and the rectifier 122, or detecting an output signal of the rectifier 122. In other words, the Rx controller 125 may demodulate a message received using the in-band communication.

Additionally, the Rx controller 125 may adjust an impedance of the target resonator 133 using the matching network 121 to modulate a signal to be transmitted to the source 110. For example, the Rx controller 125 may adjust the matching network 121 to increase the impedance of the target resonator 133 so that a reflected wave will be detected by the Tx controller 114 of the source 110. Depending on whether the reflected wave is detected, the Tx controller 114 may detect a first value, for example, a binary number "0," or a second value, for example, a binary number "1." For example, when the reflected wave is detected, the Tx controller 114 may detect "0", and when the reflected wave is not detected, the Tx controller 114 may detect "1". Alternatively, when the reflected wave is detected, the Tx controller 114 may detect "1", and when the reflected wave is not detected, the Tx controller 114 may detect "0".

The communication unit 124 of the target 120 may transmit a response message to the communication unit 115 of the source 110. For example, the response message may include any one or any combination of a product type of the target 120, manufacturer information of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of power consumed by the target 120, an identifier (ID) of the target 120, product version information of the target 120, standard information of the target 120, and any other information about the target 120.

The communication unit 124 may perform out-of-band communication using a separate communication channel. For example, the communication unit 124 may include a communication module, such as a ZigBee module, a Bluetooth module, or any other communication module known to one of ordinary skill in the art, that the communication unit 124 may use to transmit and receive the data 140 to and from the source 110 using the out-of-band communication.

The communication unit 124 may receive a wake-up request message from the source 110, and the power detector 127 may detect an amount of power received by the target resonator 133. The communication unit 124 may transmit to the source 110 information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

In the following description of FIGS. 2A through 4B, unless otherwise indicated, the term "resonator" may refer to both a source resonator, and a target resonator. The resonator in FIGS. 2A through 4B may be used as the resonators described with respect to FIGS. 1 and 5-12.

Figure 2A:
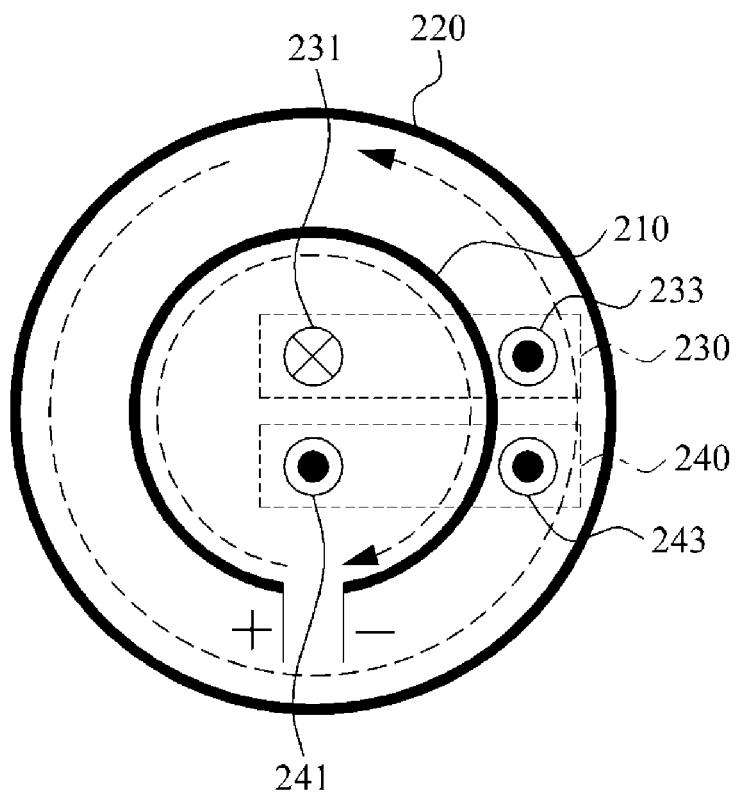
FIGS. 2A and 2B illustrate examples of a distribution of a magnetic field in a feeder and a resonator.
Figure 2B:
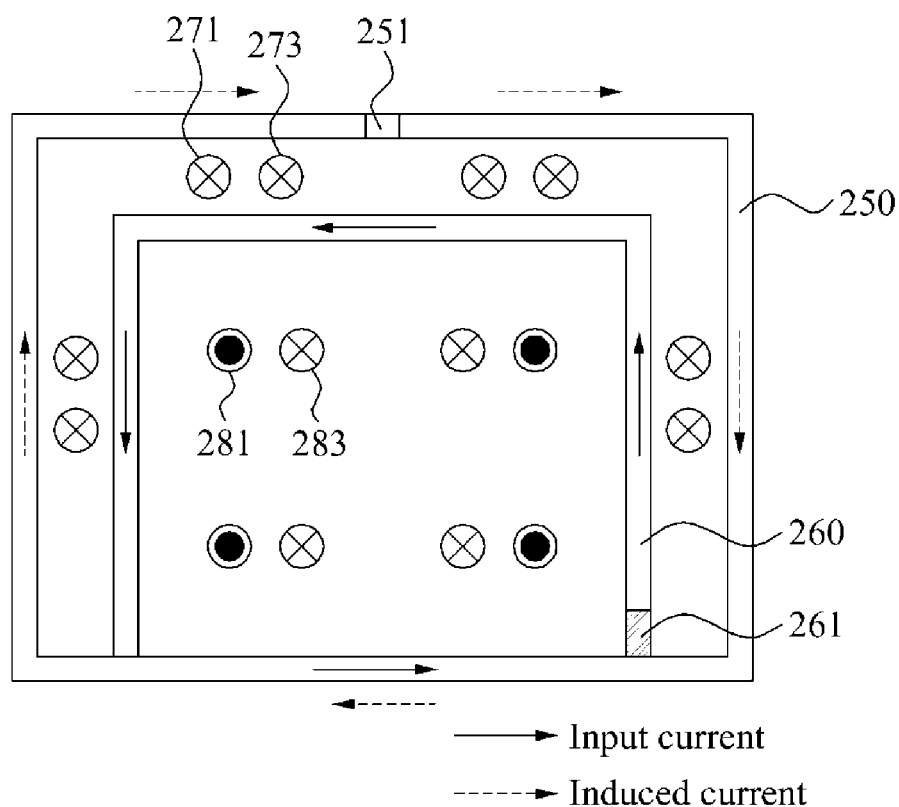

FIGS. 2A and 2B illustrate examples of a distribution of a magnetic field in a feeder and a resonator. When a resonator receives power supplied through a separate feeder, a magnetic field is generated in both the feeder and the resonator. A source resonator and a target resonator may each have a dual loop structure including an external loop and an internal loop.

FIG. 2A is a diagram illustrating an example of a structure of a wireless power transmitter in which a feeder 210 and a resonator 220 do not have a common ground. Referring to FIG. 2A, when an input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210, which is out of the plane of FIG. 2A. The magnetic field 230 generated by the feeder 210 induces a current to flow in the resonator 220. A direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field 240 generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 230 generated by the feeder 210 and the magnetic field 240 generated by the resonator 220 are combined, a strength of the total magnetic field decreases inside the feeder 210, but increases outside the feeder 210. Accordingly, when power is supplied to the resonator 220 through the feeder 210 configured as illustrated in FIG. 2A, the strength of the total magnetic field decreases in the portion of the resonator 220 inside the feeder 210, but increases in the portion of the resonator 220 outside the feeder 210. When a magnetic field is randomly or not uniformly distributed in the resonator 220, it may be difficult to perform impedance matching because an input impedance may frequently vary. Additionally, when the strength of the total magnetic field increases, a wireless power transmission efficiency increases. Conversely, when the strength of the total magnetic field decreases, the wireless power transmission efficiency decreases. Accordingly, the wireless power transmission efficiency may be reduced on average.

FIG. 2B illustrates an example of a structure of a wireless power transmission apparatus in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, and a current is induced in the resonator 250 by the magnetic field. Additionally, another magnetic field is generated by the induced current flowing in the resonator 250. In this example, a direction of the input current flowing in the feeder 260 is opposite to a direction of the induced current flowing in the resonator 250. Accordingly, in a region between the resonator 250 and the feeder 260, a direction 271 of the magnetic field generated by the input current is the same as a direction 273 of the magnetic field generated by the induced current, and thus the strength of the total magnetic field increases. Conversely, inside the feeder 260, a direction 281 of the magnetic field generated by the input current is opposite to a direction 283 of the magnetic field generated by the induced current, and thus the strength of the total magnetic field decreases. Therefore, the strength of the total magnetic field decreases in a portion of the resonator 250 inside the feeder 260, but increases in a portion of the resonator 250 outside the feeder 260.

An input impedance may be adjusted by adjusting an internal area of the feeder 260. The input impedance is an impedance viewed from the feeder 260 to the resonator 250. When the internal area of the feeder 260 increases, the input impedance increases, and when the internal area of the feeder 260 decreases, the input impedance decreases. However, if the magnetic field is randomly or not uniformly distributed in the resonator 250, the input impedance may vary based on a location of a target even if the internal area of the feeder 260 has been adjusted to adjust the input impedance to match an output impedance of a power amplifier for a specific location of the target device. Accordingly, a separate matching network may be needed to match the input impedance to the output impedance of the power amplifier. For example, when the input impedance increases, a separate matching network may be needed to match the increased input impedance to a relatively low output impedance of the power amplifier.

Figure 3A:
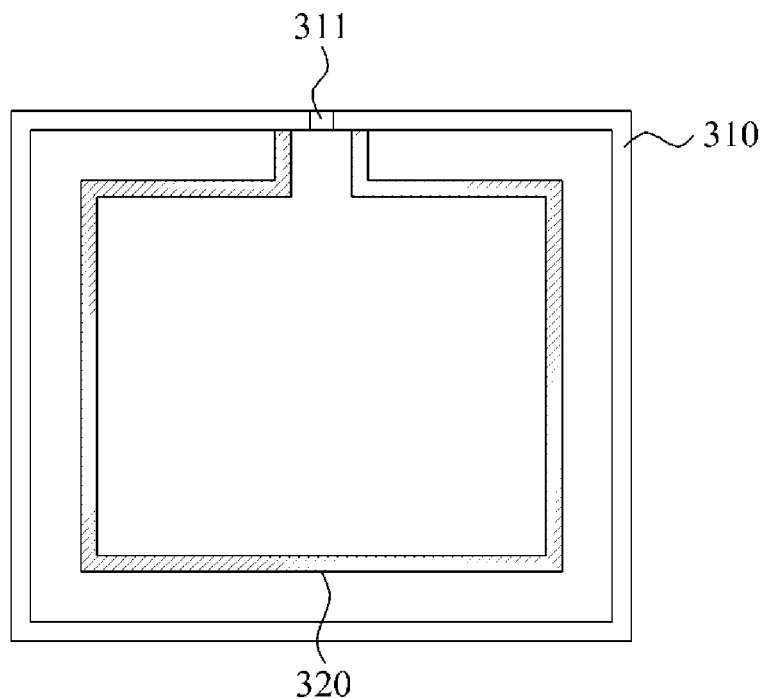
FIGS. 3A and 3B illustrate an example of a wireless power transmission apparatus.
Figure 3B:
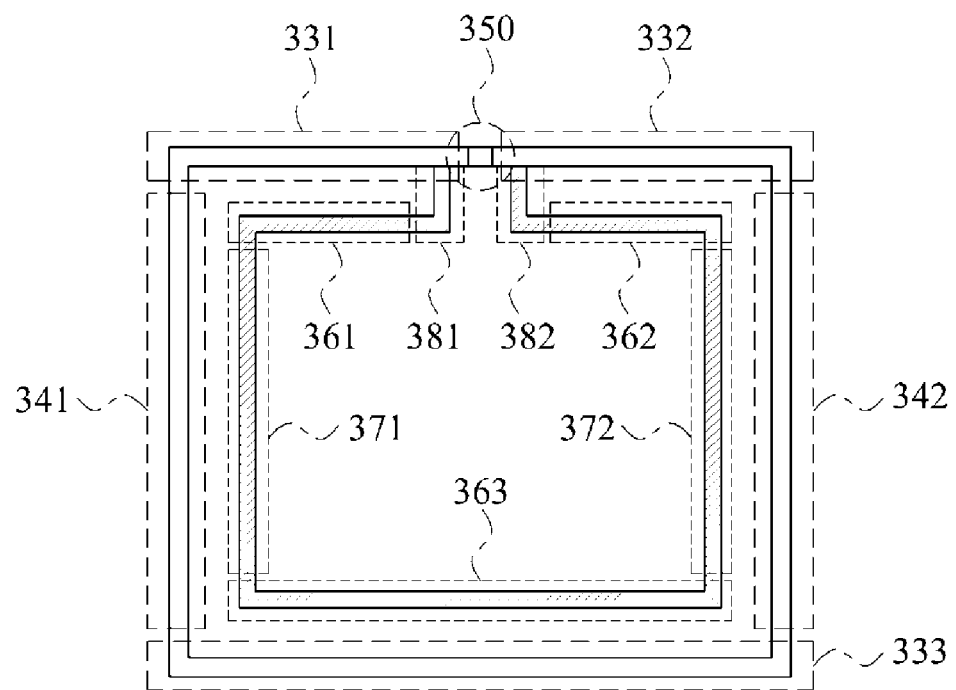

FIGS. 3A and 3B illustrate an example of a wireless power transmission apparatus.

Referring to FIG. 3A, the wireless power transmission apparatus includes a resonator 310, and a feeder 320. The resonator 310 includes a capacitor 311. The feeder 320 is electrically connected to both ends of the capacitor 311.

FIG. 3B illustrates in greater detail a structure of the wireless power transmission apparatus of FIG. 3A. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is connected in series between a first signal conducting portion 331 and a second signal conducting portion 332 in the first transmission line, causing an electric field to be concentrated in the capacitor 350. In general, a transmission line includes at least one conductor in an upper portion of the transmission line, and at least one conductor disposed in a lower portion of the transmission line. A current may flow through the at least one conductor disposed in the upper portion of the transmission line, and the at least one conductor disposed in the lower portion of the transmission line may be electrically grounded. In the example in FIG. 3B, a conductor disposed in the upper portion of the first transmission line is separated into two portions that will be referred to as the first signal conducting portion 331 and the second signal conducting portion 332, and a conductor disposed in the lower portion of the first transmission line will be referred to as a first ground conducting portion 333.

As illustrated in FIG. 3B, the resonator 310 has a generally two-dimensional (2D) structure. The first transmission line includes the first signal conducting portion 331 and the second signal conducting portion 332 in the upper portion of the first transmission line, and the first ground conducting portion 333 in the lower portion of the first transmission line. The first signal conducting portion 331 and the second signal conducting portion 332 are disposed to face the first ground conducting portion 333. A current flows through the first signal conducting portion 331 and the second signal conducting portion 332.

Additionally, one end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 341 is connected to the other end of the first ground conducting portion 333. Accordingly, the first signal conducting portion 331, the second signal conducting portion 332, the first ground conducting portion 333, the first conductor 341, and the second conductor 342 are connected to one another, causing the resonator 310 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted into a space between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric material having a high permittivity disposed between the zigzagged conductor lines.

The capacitor 350 inserted into the first transmission line may cause the resonator 310 to have a characteristic of a metamaterial. A metamaterial is a material having an electrical characteristic that is not found in nature, and thus may have an artificially designed structure. All materials existing in nature have a magnetic permeability and a permittivity. Most materials have a positive magnetic permeability and/or a positive permittivity.

In the case of most materials, a right-hand rule may be applied to an electric field, a magnetic field, and a Poynting vector, so the corresponding materials may be referred to as right-handed materials (RHMs). However, a metamaterial having a magnetic permeability and/or a permittivity that is not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the permittivity of the metamaterial and a sign of the magnetic permeability of the metamaterial.

If the capacitor 350 is a lumped element capacitor and a capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth-order resonance characteristic at the target frequency, and any other suitable criterion. Based on any one or any combination of the aforementioned criteria, the capacitance of the capacitor 350 may be appropriately determined.

The resonator 310, hereinafter referred to as the MNG resonator 310, may have a zeroth-order resonance characteristic of having a resonant frequency when a propagation constant is "0". When the MNG resonator 310 has the zeroth-order resonance characteristic, the resonant frequency is independent of a physical size of the MNG resonator 310. The resonant frequency of the MNG resonator 310 having the zeroth-order resonance characteristic may be changed without changing the physical size of the MNG resonator 310 by changing the capacitance of the capacitor 350.

In a near field, the electric field is concentrated in the capacitor 350 inserted into the first transmission line, causing the magnetic field to become dominant in the near field. The MNG resonator 310 has a relatively high 0-factor when the capacitor 350 is a lumped element capacitor, thereby increasing a wireless power transmission efficiency. The 0-factor indicates a level of an ohmic loss or a ratio of a reactance with respect to a resistance in the wireless power transmission. As will be understood by one of ordinary skill in the art, the wireless power transmission efficiency will increase as the 0-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 in an upper portion of the second transmission line, and a second ground conducting portion 363 in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

Additionally, one end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. The fifth conductor 381 and the sixth conductor 382 may be used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to one another, causing the resonator 310 and the feeder 320 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows through the feeder 320 and the resonator 310, generating a magnetic field that induces a current in the resonator 310. A direction of the input current flowing through the feeder 320 is the same as a direction of the induced current flowing through the resonator 310, thereby causing a strength of the total magnetic field in the resonator 310 to increase inside the feeder 320, but decrease outside the feeder 320.

An input impedance is determined by an area of a region between the resonator 310 and the feeder 320. Accordingly, a separate matching network used to match the input impedance to an output impedance of a power amplifier may not be needed. However, even if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have the same structure as the resonator 310. For example, if the resonator 310 has a loop structure, the feeder 320 may also have a loop structure. As another example, if the resonator 310 has a circular structure, the feeder 320 may also have a circular structure.

Figure 4A:
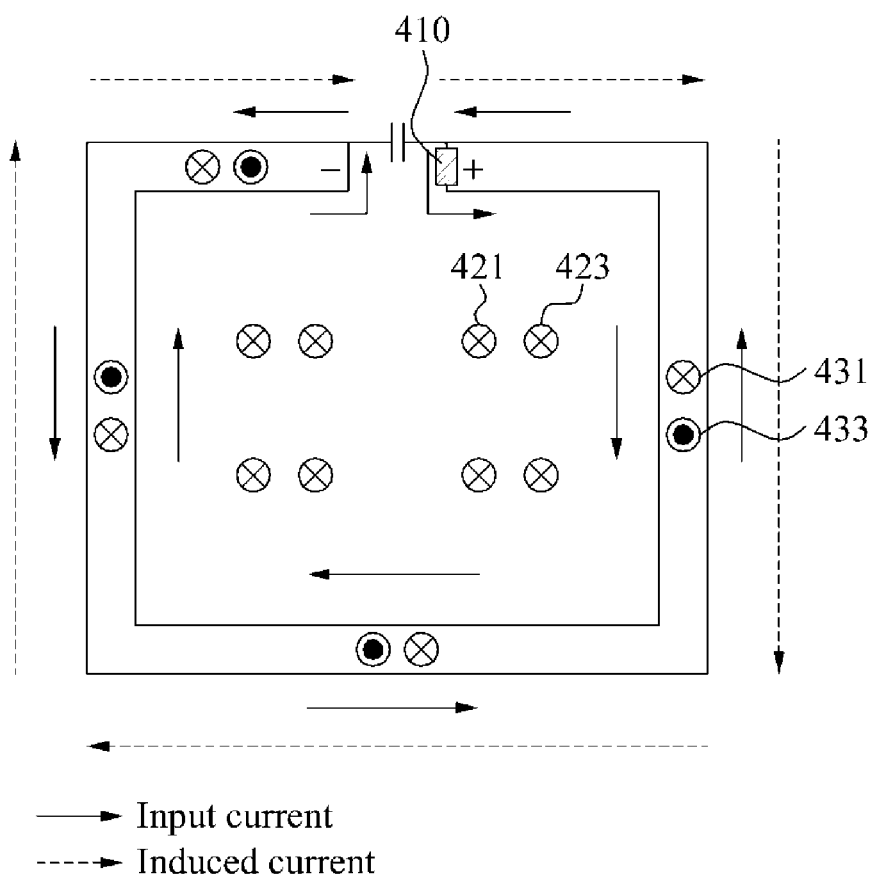
FIG. 4A illustrates an example of a distribution of a magnetic field inside a resonator produced by feeding a feeder.

FIG. 4A illustrates an example of a distribution of a magnetic field inside a resonator produced by feeding a feeder. FIG. 4A more simply illustrates the resonator 310 and the feeder 320 of FIGS. 3A and 3B, and the names of the various elements in FIG. 3B will be used in the following description of FIG. 4A for ease of description.

A feeding operation may be an operation of supplying power to a source resonator in wireless power transmission, or an operation of supplying AC power to a rectifier in wireless power transmission. FIG. 4A illustrates a direction of an input current flowing in the feeder 320, and a direction of an induced current flowing in the resonator 310 operating as a source resonator. Additionally, FIG. 4A illustrates a direction of a magnetic field generated by the input current of the feeder 320, and a direction of a magnetic field generated by the induced current of the resonator 310.

Referring to FIG. 4A, the fifth conductor 381 or the sixth conductor 382 of the feeder 320 of FIG. 3A may be used as an input port 410. In FIG. 4A, the sixth conductor 382 of the feeder 320 is being used as the input port 410. The input port 410 receives an RF signal as an input. The RF signal may be output from a power amplifier. The power amplifier may increase or decrease an amplitude of the RF signal based on a power requirement of a target. The RF signal received by the input port 410 is represented in FIG. 4A as an input current flowing in the feeder 320. The input current flows in a clockwise direction in the feeder 320 along the second transmission line of the feeder 320. The fifth conductor 381 and the sixth conductor 382 of the feeder 320 are electrically connected to the resonator 310. More specifically, the fifth conductor 381 of the feeder 320 is connected to the first signal conducting portion 331 of the resonator 310, and the sixth conductor 382 of the feeder 320 is connected to the second signal conducting portion 332 of the resonator 310. Accordingly, the input current flows in both the resonator 310 and the feeder 320. The input current flows in a counterclockwise direction in the resonator 310 along the first transmission line of the resonator 310. The input current flowing in the resonator 310 generates a magnetic field, and the magnetic field induces a current in the resonator 310. The induced current flows in a clockwise direction in the resonator 310 along the first transmission line of the resonator 310. The induced current in the resonator 310 supplies energy to the capacitor 311 of the resonator 310, and also generates a magnetic field. In this example, the input current flowing in the feeder 320 and the resonator 310 of FIG. 3A is indicated by the solid lines with arrowheads in FIG. 4A, and the induced current flowing in the resonator 310 is indicated by the dashed lines with arrowheads in FIG. 4A.

A direction of a magnetic field generated by a current is determined based on the right-hand rule. As illustrated in FIG. 4A, inside the feeder 320, a direction 421 of the magnetic field generated by the input current flowing in the feeder 320 is the same as a direction 423 of a magnetic field generated by the induced current flowing in the resonator 310. Accordingly, a strength of the total magnetic field increases inside the feeder 320.

In contrast, as illustrated in FIG. 4A, in a region between the feeder 320 and the resonator 310, a direction 433 of a magnetic field generated by the input current flowing in the feeder 320 is opposite to a direction 431 of a magnetic field generated by the induced current flowing in the resonator 310. Accordingly, the strength of the total magnetic field decreases in the region between the feeder 320 and the resonator 310.

Typically, in a resonator having a loop structure, a strength of a magnetic field decreases in the center of the resonator, and increases near an outer periphery of the resonator. However, referring to FIG. 4A, since the feeder 320 is electrically connected to both ends of the capacitor 311 of the resonator 310, the direction of the induced current in the resonator 310 is the same as the direction of the input current in the feeder 320. Since the direction of the induced current in the resonator 310 is the same as the direction the input current in the feeder 320, the strength of the total magnetic field increases inside the feeder 320, and decreases outside the feeder 320. As a result, due to the feeder 320, the strength of the total magnetic field increases in the center of the resonator 310 having the loop structure, and decreases near an outer periphery of the resonator 310, thereby compensating for the normal characteristic of the resonator 310 having the loop structure in which the strength of the magnetic field decreases in the center of the resonator 310, and increases near the outer periphery of the resonator 310. Thus, the strength of the total magnetic field may be constant inside the resonator 310.

A wireless power transmission efficiency of transmitting power from a source resonator to a target resonator is proportional to the strength of the total magnetic field generated in the source resonator. In other words, when the strength of the total magnetic field increases in the center of the source resonator, the wireless power transmission efficiency also increases.

Figure 4B:
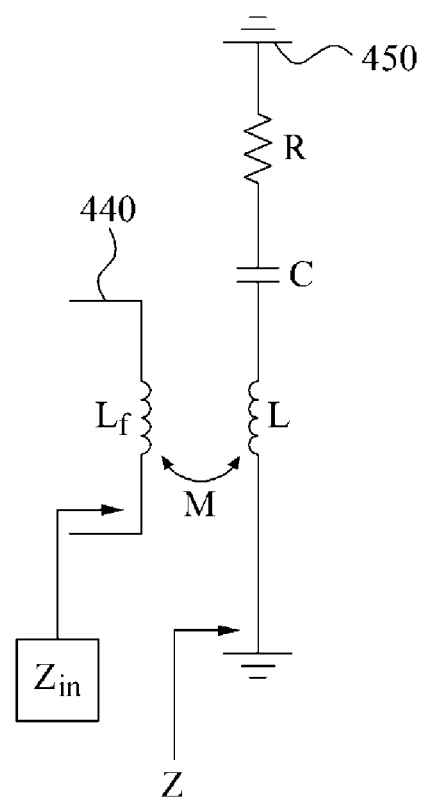
FIG. 4B illustrates an example of equivalent circuits of a feeder and a resonator.

FIG. 4B illustrates an example of equivalent circuits of a feeder and a resonator. Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An example of an input impedance $Z_{in}$ viewed in a direction from the feeder 440 to the resonator 450 may be expressed by the following Equation 1.

$$Z_{in} = \frac{(\omega M)^2}{Z} \quad (1)$$

In Equation 1, M denotes a mutual inductance between the feeder 440 and the resonator 450, ω denotes a resonant frequency between the feeder 440 and the resonator 450, and Z denotes an impedance viewed in a direction from the resonator 450 to a target. As can be seen from Equation 1, the input impedance $Z_{in}$ is proportional to the square of the mutual inductance M. Accordingly, the input impedance $Z_{in}$ may be adjusted by adjusting the mutual inductance M between the feeder 440 and the resonator 450. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

In the resonator 450 and the feeder 440 included in a wireless power reception apparatus, a magnetic field may be distributed as illustrated in FIG. 4A. The resonator 450 may operate as a target resonator. For example, the target resonator may receive wireless power from a source resonator via magnetic coupling with the source resonator. The received wireless power induces a current in the target resonator. The induced current in the target resonator generates a magnetic field, which induces a current in the feeder 440. If the resonator 450 is connected to the feeder 440 as illustrated in FIG. 4A, a direction of the induced current flowing in the resonator 450 will be the same as a direction of the induced current flowing in the feeder 440. Accordingly, for the reasons discussed above in connection with FIG. 4A, the strength of the total magnetic field will increase inside the feeder 440, and will decrease in the region between the feeder 440 and the resonator 450.

Hereinafter, for ease of description, a "source" or a "wireless power transmission apparatus" will be referred to as a power transmitting unit (PTU). A "target" or a "wireless power reception apparatus" will be referred to as a power receiving unit (PRU). A PTU operating in a master mode may be referred to as a "master device", and a PTU operating in a slave mode may be referred to as a "slave device".

A master device may be network-connected to at least one slave device. The expression "network-connected" refers to configuring a network to transmit and receive data between devices. In a network, the master device is a device that controls the slave device, and the slave device is controlled by the master device.

Figure 5:
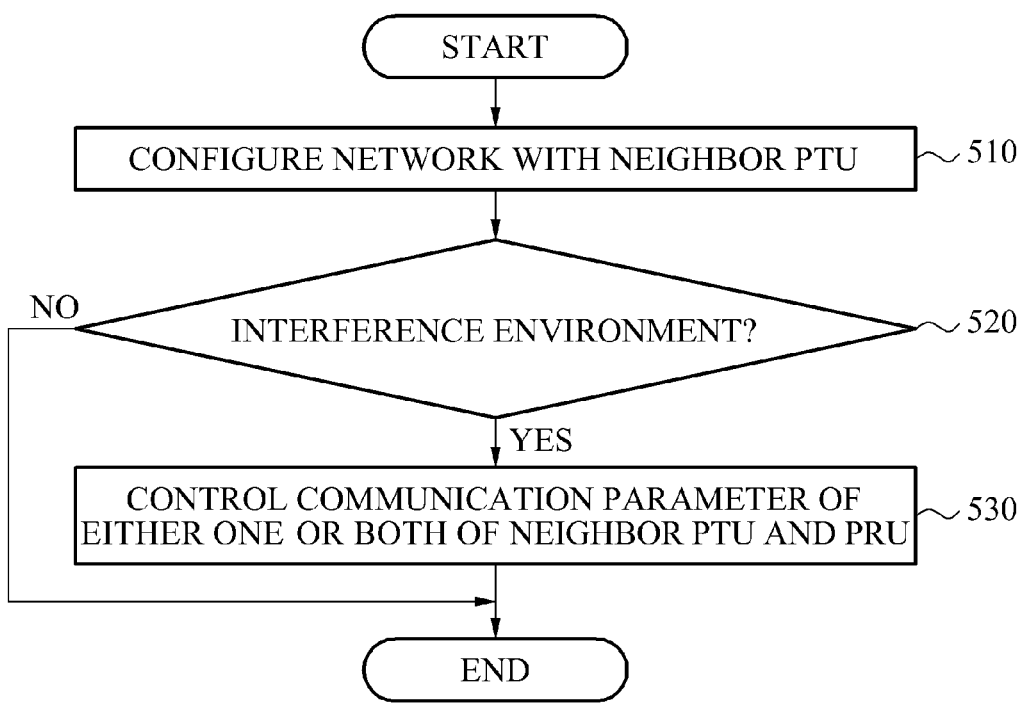
FIG. 5 illustrates an example of an interference control method of a power transmitting unit (PTU).

FIG. 5 illustrates an example of an interference control method of a PTU.

Referring to FIG. 5, in 510, the PTU configures a network with a neighbor PTU. A neighbor PTU is a PTU existing in a vicinity of the PTU. There may be plurality of neighbor PTUs. Examples of operation modes of the PTU include a master mode and a slave mode.

The PTU may perform in-band communication or out-of-band communication with the neighbor PTU or a PRU. Examples of the in-band communication include near field communication (NFC) and radio frequency identification (RFID) communication. Examples of the out-of-band communication include Bluetooth communication and Bluetooth low energy (BLE) communication.

The PTU may automatically configure a network with the neighbor PTU. In this example, the PTU may be operated in the master mode or the slave mode. When power is supplied to the PTU, the PTU may verify whether a master device is present in the vicinity of the PTU. In this instance, the PTU may transmit or receive a search signal using the out-of-band communication to verify whether a master device is present in the vicinity of the PTU. The search signal may include an advertisement signal. In one example, the PTU may set its operation mode to be the master mode, and transmit or broadcast the search signal to the neighbor PTU. When a response signal is received from the neighbor PTU in response to the search signal, the PTU may determine that a master device is present in the vicinity of the PTU. When a response signal is not received from the neighbor PTU in response to the search signal, the PTU may determine that a master device is absent in the vicinity of the PTU. In another example, the PTU may set its operation mode to be the slave mode, and receive the search signal from the neighbor PTU. When the search signal is received, the PTU may determine that a master device is present in the vicinity of the PTU. When a search signal is not received, the PTU may determine that a master device is absent in the vicinity of the PTU.

When the PTU determines that a master device is present in the vicinity of the PTU, the PTU may set its operation mode to be the slave mode. When the PTU determines that a master device is absent in the vicinity of the PTU, the PTU may set its operation mode to be the master mode.

When the PTU is operated in the master mode, the PTU may periodically monitor whether a slave device is present in the vicinity of the PTU. When the PTU detects a slave device in the vicinity of the PTU, the PTU may transmit a connection request signal to the slave device. When the PTU receives a response signal from the slave device in response to the connection request signal, the PTU may be network-connected to the slave device. Accordingly, the PTU may operate as a master device that controls the slave device.

When the PTU operates in the slave mode, the PTU may receive a connection request signal from the master device. The PTU may transmit a response signal to the master device in response to the connection request signal. Accordingly, the PTU may be network-connected to the master device.

The PTU may configure a piconet or a scatternet. A piconet is a network in which a PTU and a neighbor PTU configure the same network, and a scatternet is a network in which a plurality of piconets are mutually connected and a PTU and a neighbor PTU configure different networks.

In addition, the PTU may configure a network arbitrarily with a host. An arbitrary network is a network in which locations and parameters of nodes are arbitrarily variable, as opposed to a network in which locations and parameters of nodes are fixed. Examples of the host include devices capable of configuring a network, for example, a laptop computer, a PC, a server, and any other device capable of configuring a network. When the PTU configures a network arbitrarily with the host, a number of PTUs and a number of neighbor PTUs may be predetermined depending on a communication state between the PTUs and the host and a type of the network. For example, the Bluetooth specification specifies that the maximum number of devices that may be connected at one time is seven. In contrast, the Bluetooth low energy specification does not specify a maximum number of devices that may be connected at one time. The PTU may perform wired communication or wireless communication with the host. The PTU may transmit a search signal to a device capable of performing wired communication or wireless communication with the PTU, and recognize a device responding to the search signal as a host. The PTU may set its operation mode to be the slave mode, and be network-connected to a found host. In this example, the host may operate as a master device, and the PTU may operate as a slave device and be network-connected to the host.

In 520, the PTU determines whether the PTU is in an interference environment in which interference by the neighbor PTU occurs. When neighbor PTUs are concentrated in an area having a predetermined size, interference may occur when the PTU communicates with a neighbor PTU or a PRU. When interference occurs, a signal transmitted or received by the PTU may be distorted, or a signal transmitted by the PTU may collide with a signal transmitted by a neighbor PTU, and a transmission and reception time may be delayed. Accordingly, the PTU may determine whether the PTU is in the interference environment, and prevent, reduce, or eliminate the interference. In this example, the PTU may operate in the master mode, and share information, for example, a communication parameter, with the neighbor PTU.

The PTU may determine whether the PTU is in the interference environment based on a communication error rate. The PTU may detect the communication error rate in communication performed with the neighbor PTU. In one example, the PTU may detect the communication error rate using an error detection code. The PTU may compare the detected communication error rate to a predetermined reference rate. When the detected communication error rate is lower than the predetermined reference rate, the PTU may determine that the PTU is in an environment in which interference does not occur. Conversely, when the detected communication error rate is greater than or equal to the predetermined reference rate, the PTU may determine that the PTU is in the interference environment.

The PTU may determine whether the PTU is in the interference environment based on a number of neighbor PTUs. The PTU may detect the number of the neighbor PTUs. In this instance, the PTU may detect a neighbor PTU configuring the same network with the PTU, and also detect a neighbor PTU configuring a network different from a network configured by the PTU. An area in which the PTU detects the number of the neighbor PTUs may be preset. The PTU may compare the detected number of the neighbor PTUs to a predetermined reference number. When the detected number of the neighbor PTUs is less than the predetermined reference number, the PTU may determine that the PTU is in an environment in which interference does not occur. When the detected number of the neighbor PTUs is greater than or equal to the predetermined reference number, the PTU may determine that the PTU is in the interference environment.

The PTU may determine whether the PTU is in the interference environment based on a received signal strength indicator (RSSI). The PTU may detect an RSSI of the neighbor PTU or the PRU. For example, the neighbor PTU or the PRU may measure an RSSI with respect to the PTU, and transmit the measured RSSI to the PTU. In addition, the PTU may share the RSSI measured by the neighbor PTU. The PTU may compare the received RSSI to a predetermined reference value. An RSSI greater than the predetermined reference value indicates that PTUs are concentrated in an area having a predetermined size. Accordingly, when the detected RSSI is greater than or equal to the predetermined reference value, the PTU may determine that the PTU is in the interference environment. Conversely, when the detected RSSI is less than the predetermined reference value, the PTU may determine that the PTU is in an environment in which interference does not occur.

The PTU may determine whether the PTU is in the interference environment based on a frequency channel being used. The PTU may perform out-of-band communication with the neighbor PTU or the PRU. Examples of the out-of-band communication include Bluetooth communication and BLE communication. The Bluetooth communication may be performed using a communication frequency in a 2.4 gigahertz (GHz) band and 79 channels, and the BLE communication may be performed using a communication in a 2.4 GHz band and 40 channels. The PTU may detect a frequency channel being used by the neighbor PTU. The PTU may compare a number of detected frequency channels being used by neighbor PTUs to a predetermined reference value. A number of frequency channels being used by neighbor PTUs that is greater than or equal to the predetermined reference value may indicate that a number of the neighbor PTUs may be great enough to cause interference. Accordingly, when the number of the detected frequency channels being used by the neighbor PTUs is greater than or equal to the predetermined reference value, the PTU may determine that the PTU is in the interference environment. Conversely, when the number of the frequency channels being used by the neighbor PTUs is less than the predetermined reference value, the PTU may determine that the PTU is in an environment in which interference does not occur.

When the PTU is in the interference environment, the PTU controls a communication parameter of either one or both of the neighbor PTU and the PRU in 530. The communication parameter may include any one or any combination of a communication time, a transmission power, and a communication frequency.

The PTU may control an interval of a report signal received from the PRU. The report signal may include a dynamic parameter representing one or more measured values that may change while the PRU is being charged. The PTU may receive the report signal from the PRU to detect a charging status of the PRU, whether the PRU is in a wireless power transmission area, and other information. For example, the PTU may receive the report signal from the PRU at 250-millisecond (ms) intervals. When a transmission error occurs in the report signal, a charging power control error, a PRU recognition error, and other errors may occur. In one example, the report signal may include any one or any combination of information on power received by the PRU, information on a state of the PRU, and information on a temperature of the PRU. For example, the report signal may include any one or any combination of an output voltage $V_{RECT}$ of a rectifier, an output current $I_{RECT}$ of the rectifier, a voltage $V_{OUT}$ of a charging or battery port, a current $1_{OUT}$ of the charging or battery port, a temperature of the PRU, a minimum threshold value $V_{RECT\_MIN\_DYN}$ of an output voltage of the rectifier, a target value $V_{RECT\_SET\_DYN}$ of an output voltage of the rectifier, a maximum threshold value $V_{RECT\_HIGH\_DYN}$ of an output voltage of the rectifier, and a PRU alert.

The PTU may control interference by controlling an interval of the report signal. The neighbor PTU or the PTU receiving the report signal may transmit a response signal responding to the report signal. An interval of the response signal may be the same as the interval of the report signal.

In one example, when the intervals of the report signal and the response signal are relatively short in the interference environment, a number of signals transmitted and received in a predetermined period of time may increase, and thus a probability that interference may occur between PTUs and a PRU may increase. In this example, the PTU may control the interval of the report signal to be relatively long, thereby decreasing the number of the signals transmitted and received in the predetermined period of time, and thus the probability that interference may occur may decrease.

In another example, the PTU may transmit, to the PRU, a control signal setting the interval of the report signal based on a number of neighbor PTUs to which the PRU transmits report signals. The PRU receiving the control signal may transmit report signals to the PRU and the neighbor PTU using the report signal interval set by the PTU.

The PTU may control either one or both of a transmission interval and a transmission start time of a signal transmitted by the neighbor PTU. The signal may be a beacon signal. The beacon signal may be a short beacon signal or a long beacon signal. The short beacon signal is a beacon signal to be used for detecting whether an object, for example, a PRU or a foreign object, is present within a predetermined range. The long beacon signal is a beacon signal to be used for waking up a PRU. In addition, a signal transmitted to the PRU may be another signal instead of the beacon signal, for example, a connection request signal, a control signal, or a data signal.

When a plurality of PTUs transmit signals, for example, beacon signals, simultaneously to a single PRU, a cross connection may occur. A cross connection is a communication connection error occurring due to an environment in which PTUs are concentrated. Accordingly, the PTU may control either one or both of the transmission interval and the transmission start time of the signal transmitted by the neighbor PTU. In one example, the PTU may control a single PTU to transmit a signal to a single PRU during a single time slot. A time slot is an identifiable predetermined period of time. For example, the single time slot have a period of 625 microseconds (µs).

Since the PTU may share a communication parameter with the neighbor PTUs, the PTU may obtain information on signals transmitted by the neighbor PTUs. When signals transmitted by the PTU overlap the signals transmitted by the neighbor PTUs in a time slot, the PTU may reset information on the signals transmitted by the neighbor PTUs to prevent the signals transmitted by the PTU from overlapping the signals transmitted by the neighbor PTUs.

In one example, the PTU may control a transmission start time of a signal sequence transmitted by the neighbor PTU. In a case in which a transmission interval of a signal sequence transmitted by the PTU to the PRU is the same as a transmission interval of a signal sequence transmitted by the neighbor PTU to the PRU, when a transmission start time of the PTU is the same as a transmission start time of the neighbor PTU, the signal sequence of the PTU may coincide with the signal sequence of the neighbor PTU, and thus the PTU and the neighbor PTU may transmit signals during the same time slot. Accordingly, the PTU may set transmission start times of the PTU and the neighbor PTU to be different so that the PTU and the neighbor PTU may transmit signals to the PRU during different time slots.

In another example, the PTU may control a transmission interval of a signal sequence transmitted by the neighbor PTU. A transmission interval of a signal sequence of the PTU may be the same as or different from the transmission interval of the signal sequence of the neighbor PTU. When the transmission intervals of the signal sequences of the PTU and the neighbor PTU are the same, the PTU may set the transmission start times of the PTU and the neighbor PTU to be different to control the signal sequences so the signal sequences do not overlap. Conversely, when the transmission intervals of the signal sequences of the PTU and the neighbor PTU are different from each other, the signal sequences may overlap even though the transmission start time of the PTU is different from the transmission start time of the neighbor PTU. The PTU may set the transmission start times of the PTU and the neighbor PTU, and adjust the transmission intervals of the signal sequences, so that the signal sequences do not overlap.

The PTU may control a magnitude of the transmission power. The transmission power may be a wake-up power. The PRU may perform control and communication using the wake-up power.

In one example, a great number of neighbor PTUs may be present in an area having a predetermined size. In this example, when a relatively great amount of power is transmitted by a neighbor PTU to a PRU, interference may occur. Accordingly, the PTU may control the magnitude of the transmission power of the neighbor PTU to prevent interference caused by the transmission power.

The PTU may control a frequency hopping interval. Frequency hopping refers to a technique of spreading a frequency spectrum by rapidly switching a transmission signal from one frequency to another frequency. The PTU may transmit a transmission signal to be distributed among multiple frequencies. In one example, when the PTU performs Bluetooth communication, the PTU may use 79 frequency hopping channels. In another example, when the PTU performs BLE communication, the PTU may use 40 frequency hopping channels. As used herein, the term "frequency hopping interval" is an interval during which all of the frequency hopping channels in a frequency hopping sequence are used.

In one example, the PTU and the neighbor PTU may use the same frequency hopping sequence. For example, PTUs may configure piconets. Each piconet may be distinguished from another piconet by using different frequency hopping sequences. A PTU and a neighbor PTU belonging to the same piconet may be synchronized to a same frequency hopping sequence.

As a frequency hopping interval decreases, a number of frequency channels used by the PTU or the neighbor PTU during a predetermined period of time may increase. For example, when a frequency hopping sequence is "Channel 1-Channel 2-Channel 3" and a frequency hopping interval is 3 µs, the PTU and the neighbor PTU may use a single frequency channel for 1 µs. Conversely, when the frequency hopping interval decreases to 1 µs, the PTU and the neighbor PTU, may use three frequency channels for 1 µs. Accordingly, a probability of frequency channels used by the PTU and the neighbor PTU overlapping may increase, and a probability of interference occurring may increase. The PTU may control the frequency hopping interval of the neighbor PTU to adjust the frequency channels used by the PTU and the neighbor PTU so the frequency channels do not overlap each other, thereby decreasing the probability of the interference occurring.

Figure 6A:
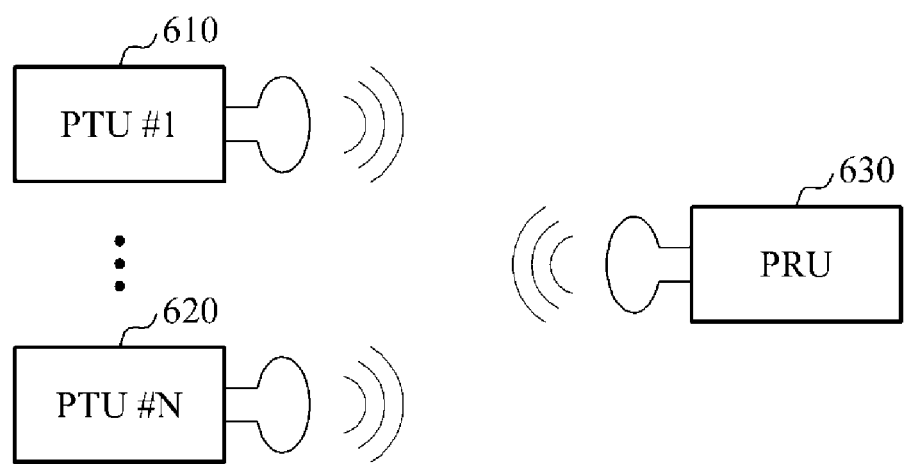
FIGS. 6A and 6B illustrate examples of an interference environment in a wireless power transmission system.
Figure 6B:
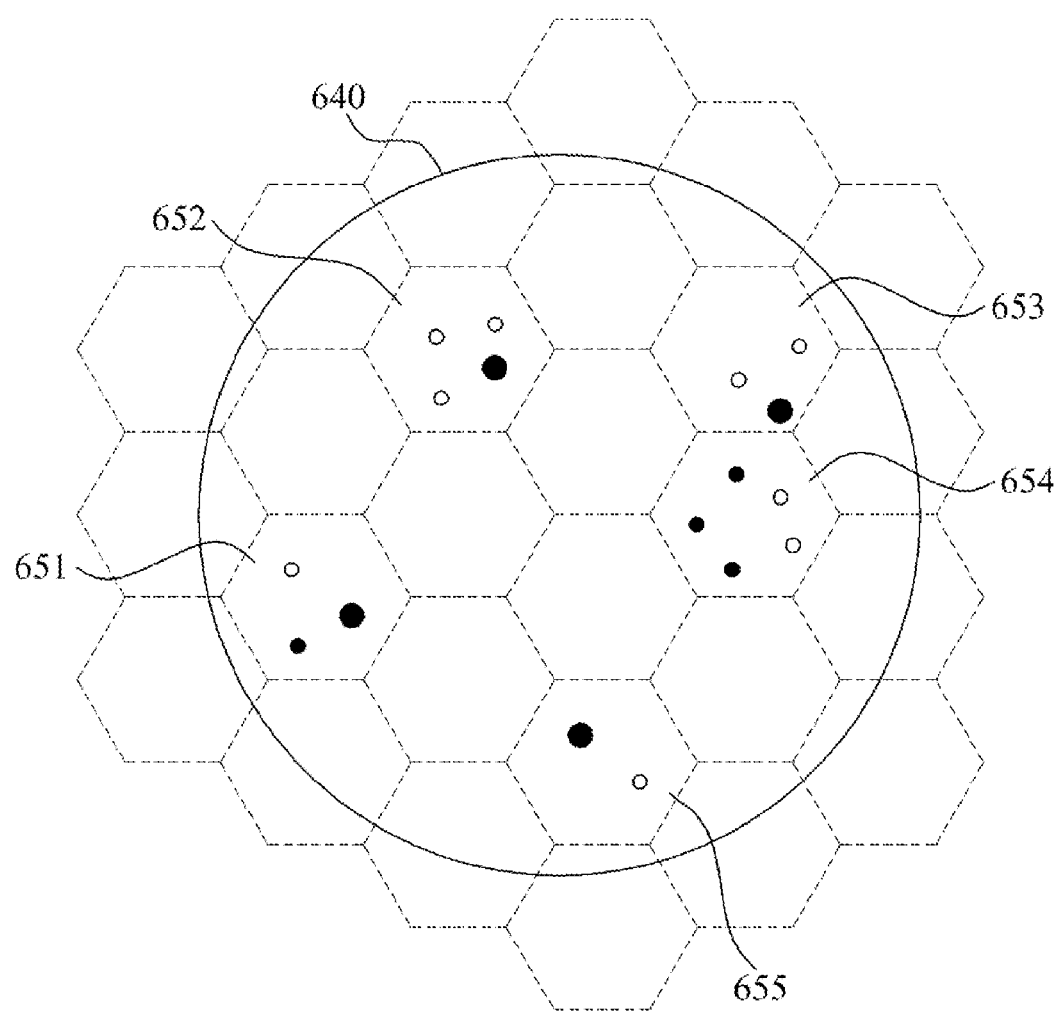

FIGS. 6A and 6B illustrate examples of an interference environment in a wireless power transmission system.

Referring to FIG. 6A, the wireless power transmission system includes PTUs including a first PTU 610 through an N-th PTU 620, and a PRU 630. Although a single PRU 630 is shown in FIG. 6A as one example, a plurality of PRUs may be provided.

The PTUs including the first PTU 610 through the N-th PTU 620 may transmit wireless power using magnetic coupling between a source resonator and a target resonator. The PTUs including the first PTU 610 through the N-th PTU 620 may mutually configure networks, for example, piconets or scatternets.

In a case in which the PTUs including the first PTU 610 through the N-th PTU 620 are concentrated in an area, interference may occur when the PTUs including the first PTU 610 through the N-th PTU 620 transmit signals to the PRU 630. Accordingly, one of the PTUs including the first PTU 610 through the N-th PTU 620 may operate as a master device and may control the interference by controlling communication parameters of the other PTUs, which may operate as slave devices.

Referring to FIG. 6B, white dots in cells of a communication area 640 denote PTUs, and black dots in the cells of the communication area 640 denote PRUs. In each cell, a PTU may transmit power to a PRU, and transmit and receive data to and from the PRU. Since a single PTU is provided in each of cells 651 and 655, a probability of interference occurring between a PTU and a PRU in the cells 651 and 655 is relatively low. However, since a plurality of PTUs are provided in each of cells 652 through 654, a probability of interference occurring is relatively high compared to the cells 651 and 655. To eliminate interference, communication parameters of PTUs and PRUs in the cells 652 through 654 may be controlled by at least one PTU included in each of the cells 652 through 654.

FIGS. 7A through 7D illustrate examples of a network of PTUs.

Figure 7A:
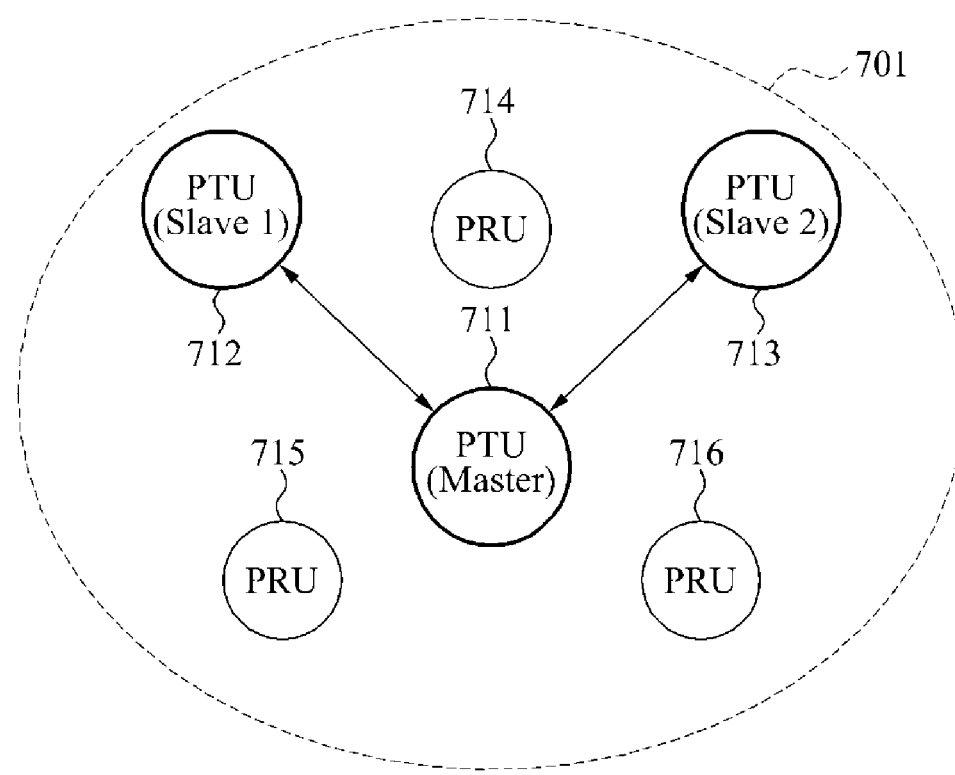
FIGS. 7A through 7D illustrate examples of a network of PTUs.

Referring to FIG. 7A, a network 701 of PTUs includes a master device 711, a first slave device 712, and a second slave device 713. PRUs 714 through 716 may be present in the network 701 among the PTUs. The PRUs 714 through 716 are located in an area in which power or signals may be received from the master device 711, the first slave device 712, and the second slave device 713. The master device 711, the first slave device 712, and the second slave device 713 transmit signals to the PRUs 714 through 716. As an example, to wake up the PRUs 714 through 716, the master device 711, the first slave device 712, and the second slave device 713 may transmit beacon signals to the PRUs 714 through 716. In this example, when the beacon signals are transmitted simultaneously by the master device 711, the first slave device 712, and the second slave device 713, a cross connection may occur. As another example, the master device 711, the first slave device 712, and the second slave device 713 may transmit data signals to the PRUs 714 through 716. In this example, when frequency channels used by the master device 711, the first slave device 712, and the second slave device 713 overlap, an interference signal may be generated. Accordingly, the master device 711 may control a communication parameter of any one or any combination of the slave devices 712 and 713 and the PRUs 714 through 716, thereby preventing an occurrence of the cross connection and eliminating the interference signal.

Figure 7B:
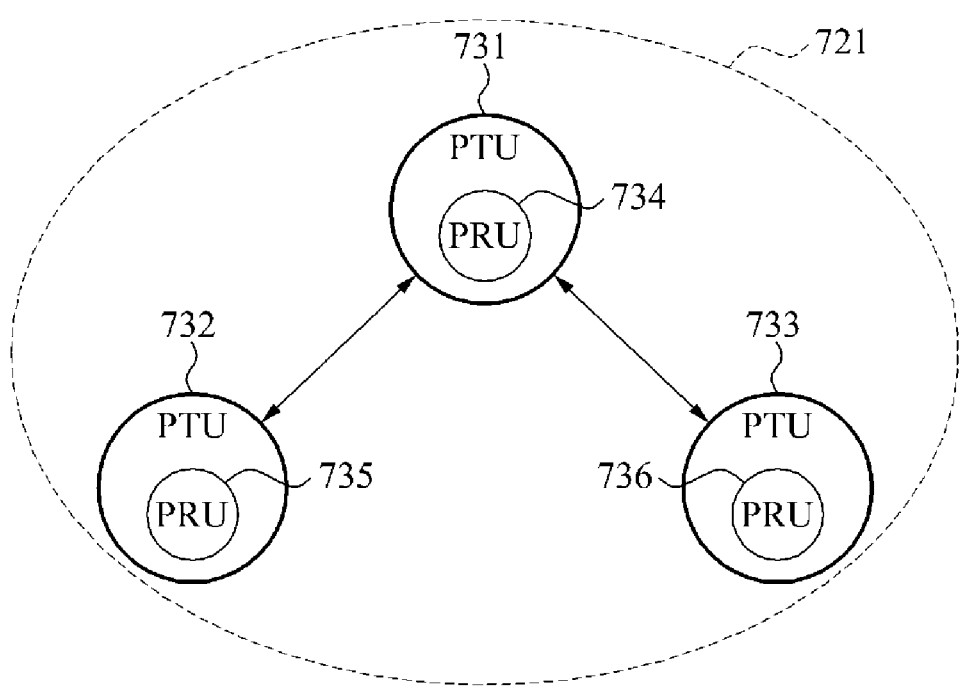

Referring to FIG. 7B, a network 721 of PTUs includes a master device 731, a first slave device 732, and a second slave device 733. PRUs 734 through 736 may be located on or adjacent to the master device 731, the first slave device 732, and the second slave device 733, respectively. In this example, the PRUs 734 through 736 receive power or signals transmitted by the PTUs 731 through 733, respectively. In addition, the PRUs 734 through 736 may receive power or signals transmitted by neighbor PTUs, other than the PTUs corresponding to the master device 731, the first slave device 732, and the second slave device 733. Accordingly, similar to FIG. 7A, a cross connection may occur or an interference signal may be generated. To prevent an occurrence of the cross connection or a generation of the interference signal, the master device 731 may control a communication parameter of any one or any combination of the slave devices 732 and 733 and the PRUs 734 through 736, thereby preventing the occurrence of the cross connection and eliminating the interference signal.

Figure 7C:
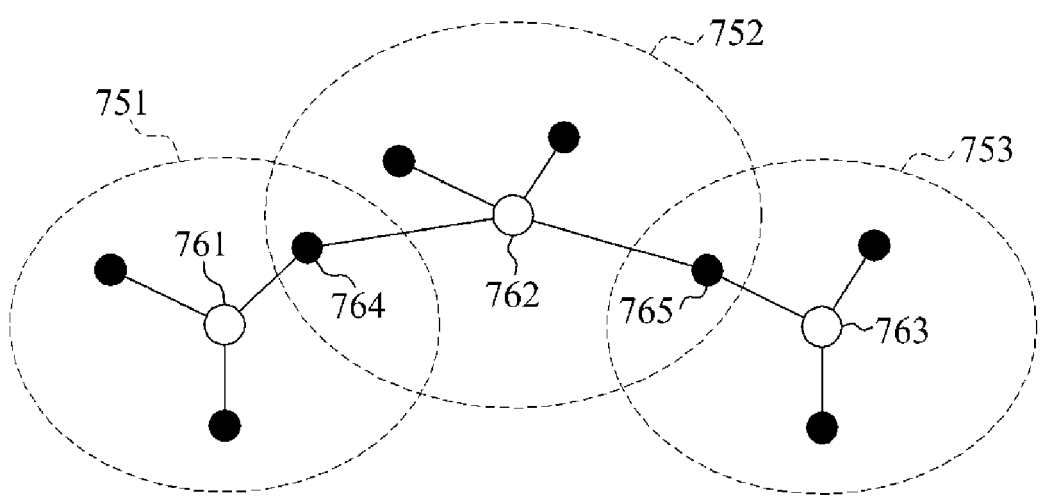

Referring to FIG. 7C, a piconet 751 includes a master device 761 and slave devices, a piconet 752 includes a master device 762 and slave devices, and a piconet 753 includes a master device 763 and slave devices. The piconets 751 through 753 may be connected to each other to configure a scatternet. A slave device 764 is located in an area in which the piconet 751 and the piconet 752 overlap, and a slave device 765 is located in an area in which the piconet 752 and the piconet 753 overlap. The slave device 764 may perform relaying between the piconet 751 and the piconet 752, and the slave device 765 may perform relaying between the piconet 752 and the piconet 753.

Figure 7D:
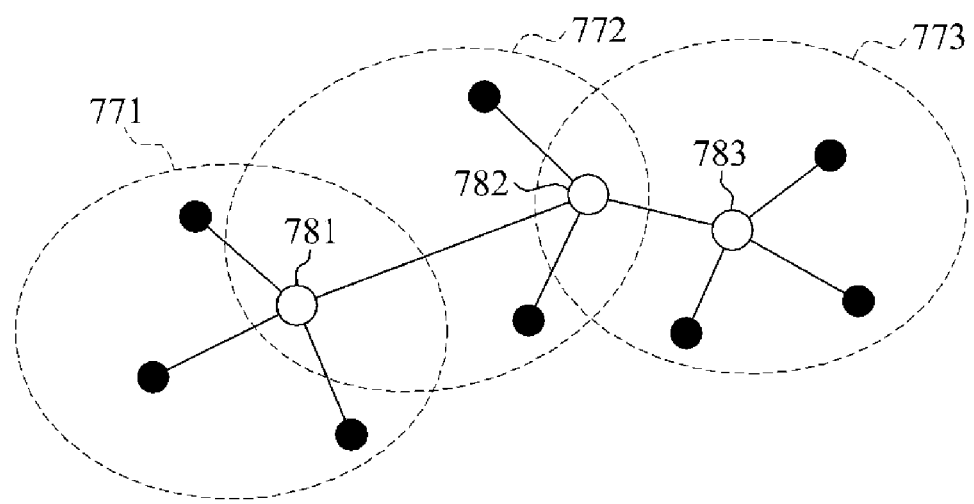

Referring to FIG. 7D, a piconet 771 includes a master device 781 and slave devices, a piconet 772 includes a master device 782 and slave devices, and a piconet 773 includes a master device 783 and slave devices. Similar to FIG. 7C, the piconets 771 through 773 may be connected to each other to configure a scatternet. A master device 781 is located in an area in which the piconet 771 and the piconet 772 overlap, and a master device 782 is located in an area in which the piconet 772 and the piconet 773 overlap. The master device 781 may perform relaying between the piconet 771 and the piconet 772, and the master device 782 may perform relaying between the piconet 772 and the piconet 773.

In FIGS. 7C and 7D, the master devices and the slave devices may share information on communication parameters. When a master device is in an interference environment in which interference may occur, the master device may control a communication parameter of a slave device. In addition, in a scatternet, one of the plurality of master devices may control communication parameters of the other master devices and the slave devices.

Figure 8A:
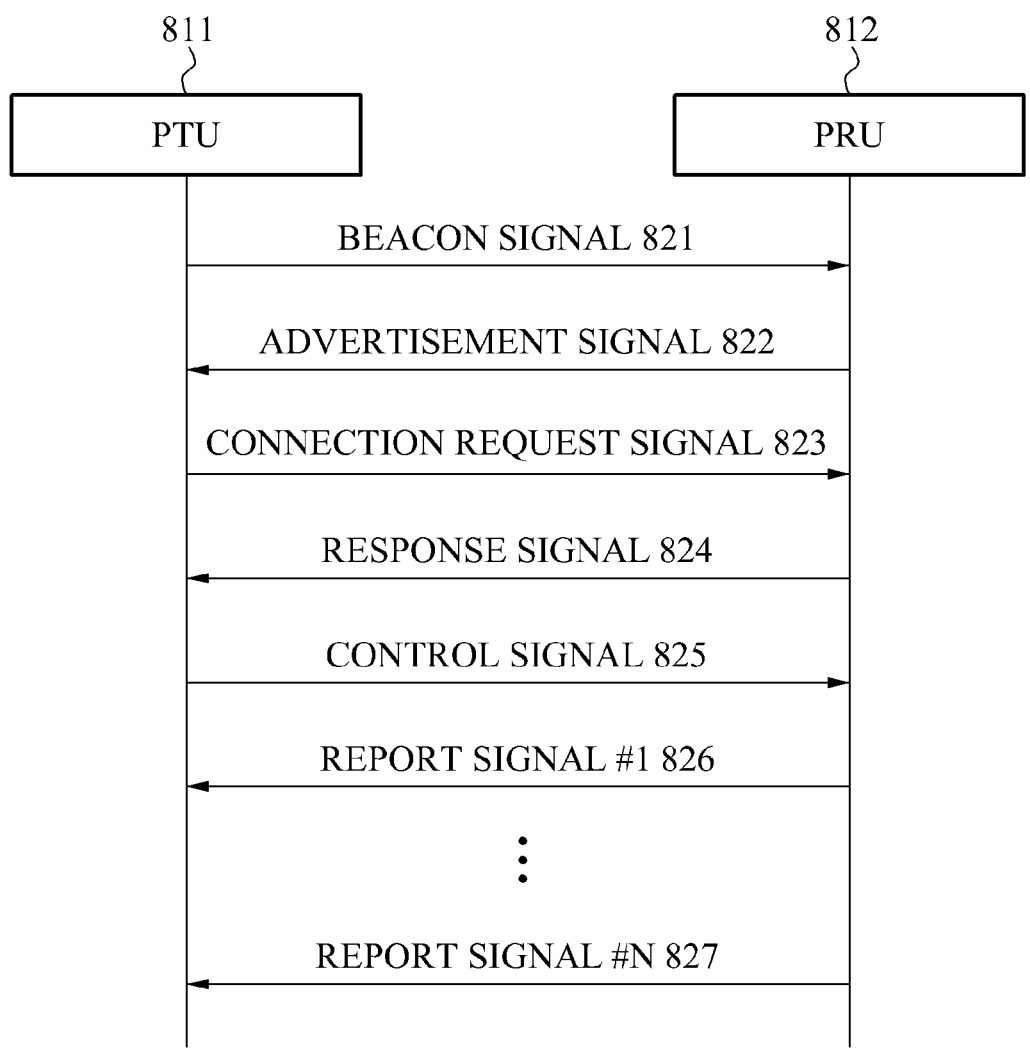
FIGS. 8A through 8C examples of a report signal.
Figure 8B:
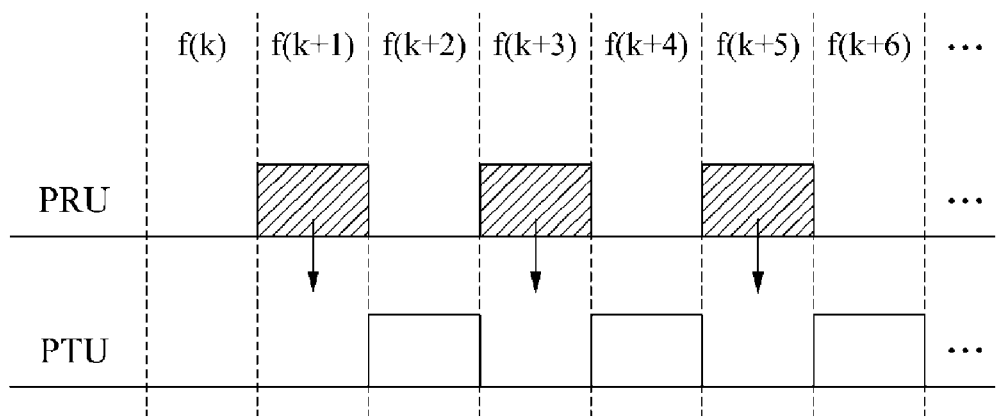
Figure 8C:
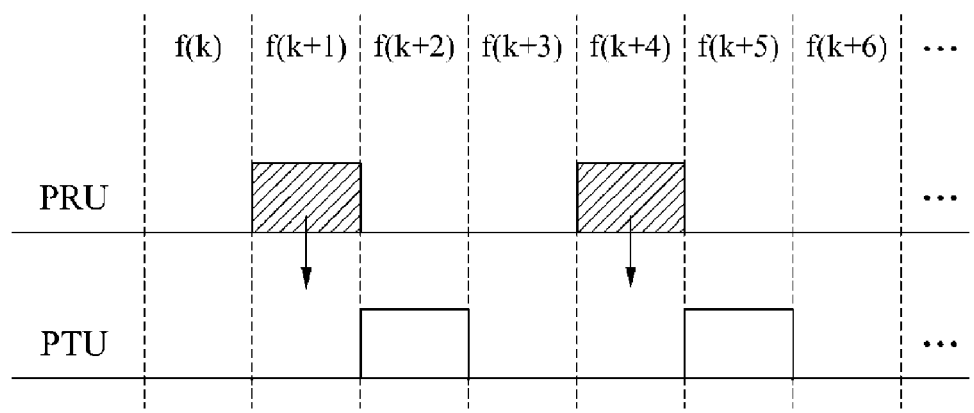

FIGS. 8A through 8C illustrate examples of a report signal.

Referring to FIG. 8A, a PTU 811 unicasts or broadcasts a beacon signal 821 to a PRU 812 to detect the PRU 812. The PRU 812 transmits an advertisement signal 822 to the PTU 811, and the PTU 811 transmits a connection request signal 823 to the PRU 812. When the PTU 811 receives a response signal 824 responding to the connection request signal 823 is received, the PTU 811 is connected to the PRU 812.

The PTU 811 receives a first report signal 826 through an N-th report signal 827 from the PRU 812 to detect a state of the PRU 812. A report signal may include a dynamic parameter. As an interval of the report signal decreases, a transmission interval of a response signal transmitted by the PTU 811 to the PRU 812 also decreases so that interference may occur. Accordingly, the PTU 811 transmits a control signal 825 to the PRU 812 to control the interval of the report signal. Transmission intervals of the report signals 826 through 827 may be adjusted based on the control signal 825 to eliminate the interference.

Referring to FIGS. 8B and 8C, f(k), f(k+1), and so on indicate time slots. A time slot is an identifiable predetermined period of time. k denotes a number of a time slot. In FIG. 8B, a PRU transmits a report signal at two-time slot intervals. A PTU transmits a response signal with respect to the report signal at two-time slot intervals. In an interference environment in which interference may occur, as the interval of the report signal decreases, the interval of the response signal of the PTU also decreases, and thus a probability that interference may occur may increase. Accordingly, the PTU may control the interval of the report signal as shown in FIG. 8C.

In FIG. 8C, the PRU transmits the report signal at 3-time slot intervals under the control of the PTU. The PTU transmits the response signal responding to the report signal at 3-time slot intervals. Accordingly, the probability that interference may occur may be reduced compared to a case in which the report signal is transmitted at 2-time slot intervals as shown in FIG. 8B.

Figure 9A:
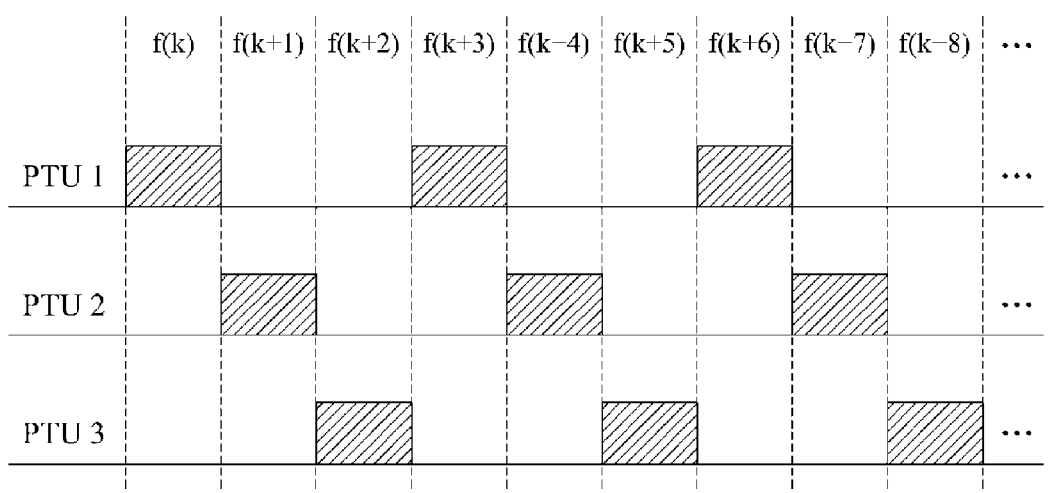

FIGS. 9A and 9B illustrate an example of controlling a transmission interval and a transmission start time.

Referring to FIG. 9A, transmission intervals of a PTU PTU 1 and neighbor PTUs PTU 2 and PTU 3 are the same, in particular, a 3-time slot interval. When transmission start times of the PTU and the neighbor PTUs are the same, a PRU may receive signals from the three PTUs simultaneously at 3-time slot intervals. In this example, interference may occur due to the neighbor PTUs. Accordingly, the PTU may control the transmission start times of the PTU and the neighbor PTUs as shown in FIG. 9A to prevent two or more PTUs from transmitting signals simultaneously.

Referring to FIG. 9B, a PTU PTU 1 may set transmission intervals of neighbor PTUs, for example, a first neighbor PTU PTU 2 and a second neighbor PTU PTU 3, differently, and transmit a signal to a PRU. The PTU may set a transmission start time of the PTU to f(k), a transmission start time of the first neighbor PTU to f(k+1), and a transmission start time of the second neighbor PTU to f(k+3). The PTU may adjust transmission intervals of the PTU and the neighbor PTUs to prevent the PTU and the neighbor PTUs from transmitting signals simultaneously. For example, the PTU may set a transmission interval of the PTU to be a 2-time slot interval, a transmission interval of the first neighbor PTU to be a 4-time slot interval, and a transmission interval of the second neighbor PTU to be an 8-time slot interval.

FIG. 10 illustrates an example of controlling a frequency hopping interval.

Referring to FIG. 10, a PTU and a neighbor PTU may transmit signals to a PRU using out-of-band communication. In one example, the out-of-band communication may be BLE communication. In a case of the BLE communication, a communication frequency of 2.4 GHz and 40 communication channels may be used. In this example, channels 0 through 36 may be used for transmitting and receiving data signals, and channels 37 through 39 may be used for transmitting and receiving advertisement signals.

In one example, the PTU may set a frequency hopping sequence of the PTU and the neighbor PTU, and transmit signals to the PRU by controlling a communication frequency based on the set frequency hopping sequence. For example, the PTU may set the frequency hopping sequence to be "Channel 1 1010-Channel 10 1020-Channel 14 1030-Channel 16 1040-Channel 24 1050".

In an environment in which interference may occur, the PTU may control a frequency hopping interval of the neighbor PTU. For example, if the frequency hopping interval is 1 µs, the neighbor PTU will use five frequency channels for 1 µs. When the PTU controls the frequency hopping interval to be 5 µs, the neighbor PTU will use a single frequency channel for 1 µs. Accordingly, a probability of overlap occurring among frequency channels used by the PTU and the neighbor PTU may be reduced, and thus a probability of interference occurring may also be reduced.

Figure 11:
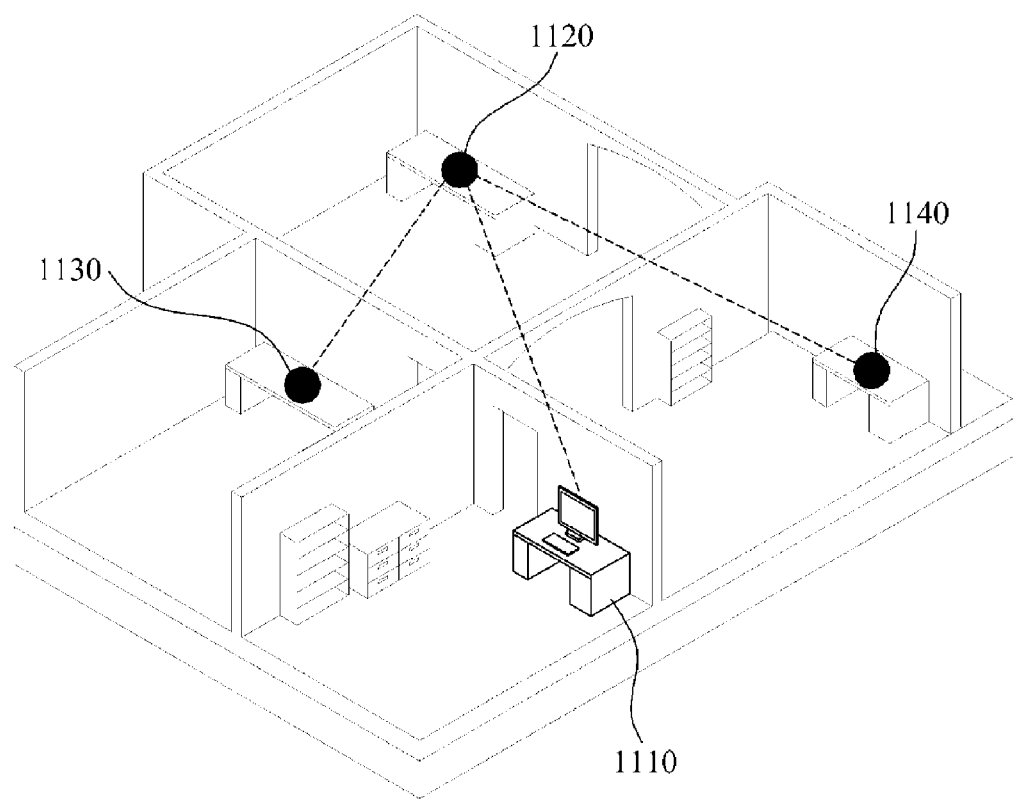
FIG. 11 is a perspective view for describing an interference control method of a PTU in an arbitrary network.

FIG. 11 is a perspective view for describing an interference control method of a PTU in an arbitrary network.

Referring to FIG. 11, an arbitrary network includes a host 1110, a PTU 1120, and neighbor PTUs 1130 and 1140. In this example, the PTU 1120 may operate in a master mode, and the neighbor PTUs 1130 and 1140 may operate in a slave mode.

In one example, an additional PTU may be connected to the arbitrary network under authorization of the host 1110. Since a number of PTUs may be predetermined, the host 1110 may pre-calculate a range of a communication parameter in which interference may not occur between the PTU 1120 and the neighbor PTUs 1130 and 1140. Accordingly, any one or any combination of communication times, transmission powers, and communication frequencies of the PTU 1120 and the neighbor PTUs 1130 and 1140 may be preset by the host.

Figure 12:
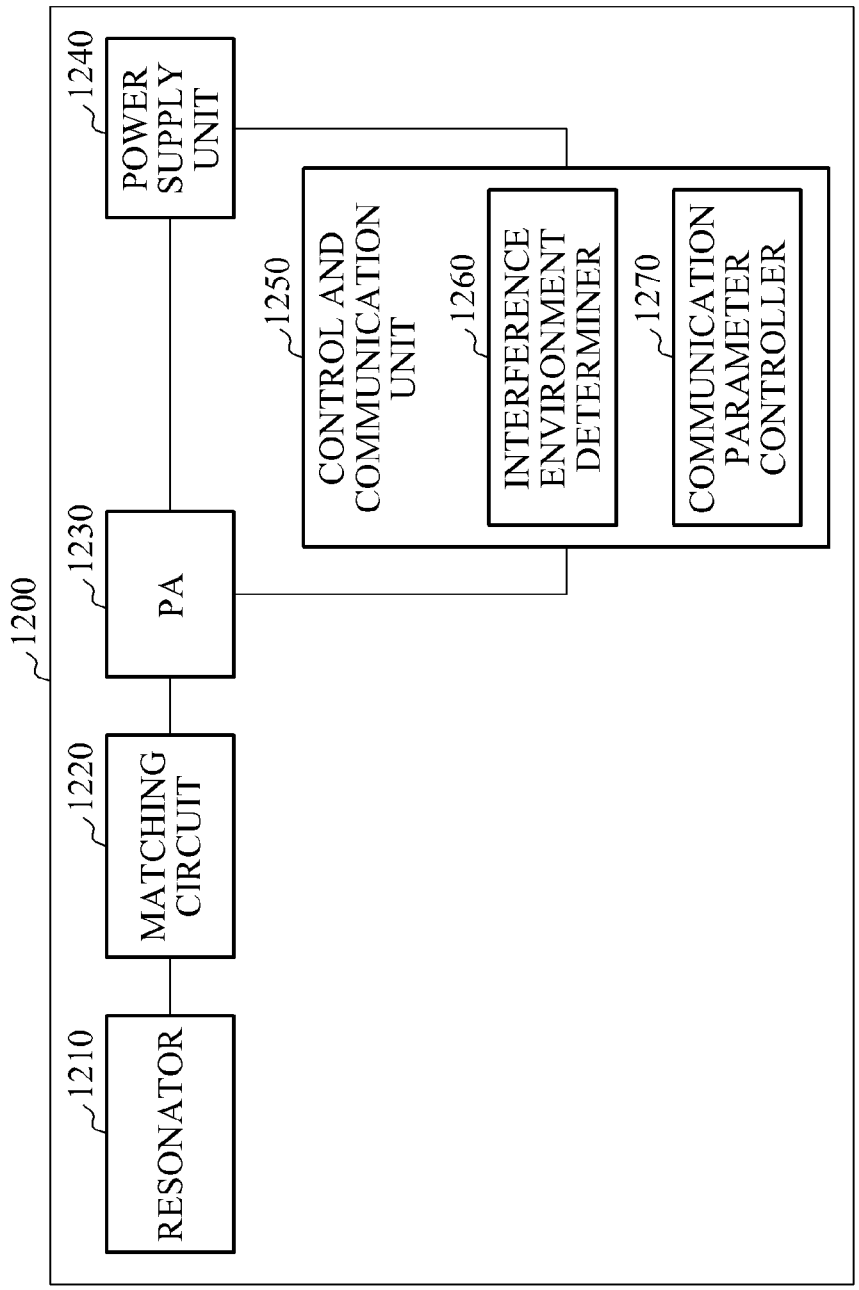
FIG. 12 illustrates an example of a PTU.

FIG. 12 illustrates an example of a PTU.

Referring to FIG. 12, a PTU 1200 includes a resonator 1210, a matching circuit 1220, a PA 1230, a power supply unit 1240, and a control and communication unit 1250.

The resonator 1210 generates magnetic field coupling with a resonator of another PTU or a PRU.

The matching circuit 1220 compensates for impedance mismatching between the PTU 1200 and the other PTU or the PRU to achieve optimal matching under the control of the control and communication unit 1250.

The PA 1230 generates power by converting a DC voltage having a predetermined level to an AC voltage under the control of the control and communication unit 1250.

The power supply unit 1240 supplies power to the PA 1230 under the control of the control and communication unit 1250.

The control and communication unit 1250 includes an interference environment determiner 1260 and a communication parameter controller 1270. The interference environment determiner 1260 determines whether the PTU 1200 is in an interference environment in which interference may occur by a neighbor PTU. The communication parameter controller 1270 controls a communication parameter of either one or both of the neighbor PTU and the PRU when the interference environment determiner determines that the PTU 1200 is in the interference environment.

The descriptions provided with reference to FIGS. 1 through 11 may be applied to the PTU 1200 of FIG. 12, and thus a duplicated description will be omitted for conciseness.

The Tx controller 114, the communication units 115 and 124, and the Rx controller 125 in FIG. 1, and the control and communication unit 1250, the interference environment determiner 1260, and the communication parameter controller 1270 in FIG. 12 described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An interference control method of a power transmitting unit (PTU), the method comprising:
    determining whether the PTU is in an interference environment in which interference by a neighbor PTU occurs; and
    controlling an interval of a report signal from the power receiving unit (PRU) and an interval of a response signal from the power transmitting unit (PTU) or the neighbor PTU responding to the report signal in response to determining the PTU is in the interference environment.

2. The method of claim 1, further comprising controlling any one or any combination of a communication time, a transmission power, and a communication frequency of either one or both of the neighbor PTU and a power receiving unit (PRU) in response to determining the PTU is in the interference environment.

3. The method of claim 2, wherein the controlling of the transmission power comprises controlling a magnitude of the transmission power.

4. The method of claim 2, wherein the controlling further comprises controlling a frequency hopping interval.

5. The method of claim 2, wherein the PTU and the neighbor PTU are in a network that has been arbitrarily configured; and any one or any combination of a communication time, a transmission power, and a communication frequency of the neighbor PTU is preset.

6. The method of claim 1, wherein the determining comprises:

detecting a communication error rate in communication between the PTU and the neighbor PTU; and determining whether the PTU is in the interference environment based on the detected communication error rate.

7. The method of claim 1, wherein the determining comprises:

detecting a number of neighbor PTUs; and determining whether the PTU is in the interference environment based on the detected number of the neighbor PTUs.

8. The method of claim 1, wherein the determining comprises:

detecting a received signal strength indicator (RSSI) of the neighbor PTU or the PRU; and determining whether the PTU is in the interference environment based on the detected RSSI.

9. The method of claim 1, wherein the determining comprises:

detecting a frequency channel being used by the neighbor PTU; and determining whether the PTU is in the interference environment based on the detected frequency channel.

10. The method of claim 1, further comprising configuring a network comprising the PTU and the neighbor PTU.

11. The method of claim 10, wherein the PTU is configured to operate in a master mode.

12. The method of claim 1, further comprising configuring a network comprising the PTU;

wherein the neighbor PTU is configured to configure the network comprising the PTU into a different type of network.

13. The method of claim 1, further comprising configuring a network comprising the PTU;

wherein the neighbor PTU is configured to configure a network that is a different type from the network comprising the PTU.

14. The method of claim 1, wherein the report signal comprises any one or any combination of information on power received by the PRU, information on a state of the PRU, and information on a temperature of the PRU.

15. The method of claim 1, wherein the controlling comprises controlling either one or both of a transmission interval and a transmission start time of a signal transmitted by the neighbor PTU.

16. The method of claim 15, wherein the signal transmitted by the neighbor PTU comprises a beacon signal.

17. The method of claim 1, further comprising sharing information on the interval of the report signal and/or the interval of the response signal with the neighbor PTU.

18. A power transmitting unit (PTU) comprising:

an interference environment determiner configured to determine whether the PTU is in an interference environment in which interference by a neighbor PTU occurs; and a communication parameter controller configured to control an interval of a report signal from the PRU and an interval of a response signal from the PTU or the neighbor PTU responding to the report signal in response to the interference environment determiner determining that the PTU is in the interference environment.

19. An interference control method of a power transmitting unit (PTU), the method comprising:

transmitting power by the PTU to a power receiving unit (PRU);

determining whether a neighbor PTU is interfering with the PTU or has a potential to interfere with the PTU; and controlling, an interval of a report signal from the PRU and an interval of a response signal from the PTU or the neighbor PTU responding to the report signal in response to determining the neighbor PTU is interfering with the PTU or has a potential to interfere with the PTU.

20. The method of claim 19, wherein the PTU is configured to operate as a master device in a network; and the neighbor PTU is configured to operate as a slave device in the network accepting commands from the PTU.

21. The method of claim 19, wherein the PTU and the neighbor PTU are connected to a network that has been arbitrarily configured under authorization of a host; and a communication parameter of each of the PTU and the neighbor PTU are preset by the host.

* * * * *